(12) United States Patent
Cramer et al.

(10) Patent No.: US 10,835,349 B2
(45) Date of Patent: Nov. 17, 2020

(54) PARAMETRIC BLURRING OF COLORS FOR TEETH IN GENERATED IMAGES

(71) Applicant: Align Technology, Inc., San Jose, CA (US)

(72) Inventors: Christopher E. Cramer, Durham, NC (US); Chad Clayton Brown, Cary, NC (US)

(73) Assignee: Align Technology, Inc., San Jose, CA (US)

( * ) Notice: Subject to any disclaimer, the term of this patent is extended or adjusted under 35 U.S.C. 154(b) by 139 days.

(21) Appl. No.: 16/041,613

(22) Filed: Jul. 20, 2018

(65) Prior Publication Data

US 2020/0022783 A1 Jan. 23, 2020

(51) Int. Cl.
| | |
|---|---|
| G06T 7/00 | (2017.01) |
| A61C 7/00 | (2006.01) |
| A61C 9/00 | (2006.01) |
| G06T 7/90 | (2017.01) |
| A61C 5/77 | (2017.01) |
| G06T 7/80 | (2017.01) |

(52) U.S. Cl.
CPC ............ *A61C 7/002* (2013.01); *A61C 9/0053* (2013.01); *G06T 7/90* (2017.01); *A61C 5/77* (2017.02); *A61C 2007/004* (2013.01); *G06T 7/80* (2017.01); *G06T 2207/10024* (2013.01); *G06T 2207/20201* (2013.01)

(58) Field of Classification Search
None
See application file for complete search history.

(56) References Cited

U.S. PATENT DOCUMENTS

| 2,467,432 A | 4/1949 | Kesling |
| 3,407,500 A | 10/1968 | Kesling |

(Continued)

FOREIGN PATENT DOCUMENTS

| EP | 774933 B1 | 12/2000 |
| JP | S6311148 A | 1/1988 |

(Continued)

OTHER PUBLICATIONS

Dentrac Corporation; Dentrac document; pp. 4-13; (year of pub. sufficiently earlier than effective US filing date and any foreign priority date) 1992.

(Continued)

*Primary Examiner* — Delomia L Gilliard
(74) *Attorney, Agent, or Firm* — Lowenstein Sandler LLP

(57) ABSTRACT

A method includes determining, from a first image, a first region comprising teeth, wherein the first region comprises a first set of pixel locations. A first parametric function is generated based on intensities at the first set of pixel locations. Image data comprising new contours of the mouth is received, wherein one or more of the teeth have a different position in the image data than in the first image. A second region comprising the teeth is determined from the image data, wherein the second region comprises a second set of pixel locations for the teeth. A new image is then generated based on the image data and the first parametric function, wherein a shape of the teeth is based on the image data and a color of the teeth is based on applying the first parametric function to the second set of pixel locations for the teeth.

20 Claims, 9 Drawing Sheets

(56) References Cited

U.S. PATENT DOCUMENTS

| | | |
|---|---|---|
| 3,600,808 A | 8/1971 | Reeve |
| 3,660,900 A | 5/1972 | Andrews |
| 3,683,502 A | 8/1972 | Wallshein |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | OHarra |
| 4,936,862 A | 6/1990 | Walker et al. |
| 4,937,928 A | 7/1990 | van der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 4,997,369 A | 3/1991 | Shafir |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,497,336 A | 3/1996 | Andersson et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,938,446 A | 8/1999 | Andersson et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren |
| 6,244,861 B1 | 6/2001 | Andreiko et al. |
| 6,261,098 B1 * | 7/2001 | Persson ............... A61C 9/002 |
| | | 433/213 |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,398,548 B1 | 6/2002 | Muhammad et al. |
| 6,402,707 B1 | 6/2002 | Ernst |
| 6,450,807 B1 | 9/2002 | Chishti et al. |
| 6,482,298 B1 | 11/2002 | Bhatnagar |
| 6,524,101 B1 | 2/2003 | Phan et al. |
| 6,554,611 B2 | 4/2003 | Chishti et al. |
| 6,572,372 B1 | 6/2003 | Phan et al. |
| 6,629,840 B2 | 10/2003 | Chishti et al. |
| 6,705,863 B2 | 3/2004 | Phan et al. |

(56) References Cited

U.S. PATENT DOCUMENTS

| | | | |
|---|---|---|---|
| 6,722,880 B2 | 4/2004 | Chishti et al. | |
| 6,749,414 B1 | 6/2004 | Hanson et al. | |
| 6,830,450 B2 | 12/2004 | Knopp et al. | |
| 7,236,842 B2 * | 6/2007 | Kopelman | A61C 5/77 |
| | | | 700/98 |
| 7,892,474 B2 | 2/2011 | Shkolnik et al. | |
| 8,234,000 B2 * | 7/2012 | Andersson | A61C 9/0006 |
| | | | 700/98 |
| 8,359,115 B2 * | 1/2013 | Kopelman | G16H 30/20 |
| | | | 700/98 |
| 9,321,215 B2 | 4/2016 | Dudley | |
| 9,511,543 B2 | 12/2016 | Tyler | |
| 2002/0006597 A1 | 1/2002 | Andreiko et al. | |
| 2003/0009252 A1 | 1/2003 | Pavlovskaia et al. | |
| 2003/0139834 A1 | 7/2003 | Nikolskiy et al. | |
| 2003/0215770 A1 * | 11/2003 | Sekino | A61K 6/807 |
| | | | 433/218 |
| 2003/0224311 A1 | 12/2003 | Cronauer | |
| 2004/0128010 A1 | 7/2004 | Pavlovskaia et al. | |
| 2005/0055118 A1 | 3/2005 | Nikolskiy et al. | |
| 2014/0185931 A1 * | 7/2014 | Aoki | H04N 1/62 |
| | | | 382/167 |
| 2015/0097315 A1 | 4/2015 | DeSimone et al. | |
| 2015/0097316 A1 | 4/2015 | DeSimone et al. | |
| 2015/0102532 A1 | 4/2015 | DeSimone et al. | |
| 2017/0076444 A1 * | 3/2017 | Petit | A61B 5/441 |

FOREIGN PATENT DOCUMENTS

| | | |
|---|---|---|
| JP | H0428359 A | 1/1992 |
| WO | 91004713 A1 | 4/1991 |
| WO | 98032394 A1 | 7/1998 |
| WO | 98044865 A1 | 10/1998 |
| WO | 98058596 A1 | 12/1998 |

OTHER PUBLICATIONS

Dent-X; "DentSim . . . Dent-x's virtual reality 3-D training simulator . . . A revolution in dental education", 6 pages; retrieved from the internet (http://www.dent-x.com/DentSim.htm); on Sep. 24, 1998.

Doyle; "Digital Dentistry, Doctors use CAD/CAM to take the pain out of extensive dental procedures", Computer Graphics World; pp. 50-52 and p. 54; Oct. 2000.

Duret et al., "CAD/CAM Imaging in Dentistry", Current Opinion in Dentistry; 1 (2); pp. 150-154; Apr. 1991.

Duret et al; CAD-CAM in Dentistry; Journal of the American Dental Association; 117(6); pp. 715-720; Nov. 1988.

Duret, "The Dental CAD/CAM, General Description of the Project", Hennson International Product Brochure, 18 pages; Jan. 1986.

Duret; Vers Une Prosthese Informatisee; Tonus; 75(15); pp. 55-57; (English translation attached); 23 pages; Nov. 15, 1985.

Economides, "The Microcomputer in the Orthodontic Office", Journal of Clinical Orthodontics; 13(11); pp. 767-772; Nov. 1979.

Elsasser, "Some Observations on the History and Uses of the Kesling Positioner", American Journal of Orthodontics; 36(5); pp. 368-374; May 1, 1950.

Faber et al., "Computerized Interactive Orthodontic Treatment Planning", American Journal of Orthodontics; 73(1 ); pp. 36-46; Jan. 1978.

Felton et al., "A Computerized Analysis of the Shape and Stability of Mandibular Arch Form", American Journal of Orthodontics and Detofacial Orthopedics, Dec. 1987, pp. 478-483, vol. 92 No. 6, The C. V. Mosby Company.

Friede et al., "Accuracy of Cephalometric Prediction in Orthognathic Surgery", Journal of Oral and Maxilofacial Surgery; 45(9); pp. 754-760; Sep. 1987.

Futterling et al, "Automated Finite Element Modeling of a Human Mandible with Dental Implants", JS WSCG '98—Conference Program; 8 pages; retrieved from the Internet (https://dspace5.zcu.cz/bitstream/11025/15851/1/Strasser_98.pdf); on Aug. 21, 2018.

Gao et al., "3-D Element Generation for Multi-Connected Complex Dental and Mandibular Structure", IEEE Proceedings International Workshop in Medical Imaging and Augmented Reality; pp. 267-271; Jun. 12, 2001.

Gim-Alldent Deutschland, "Das DUX System: Die Technik," 3 pages; (English Translation Included}; (year of pub. sufficiently earlier than effective US filing date and any foreign priority date); 2002.

Gottleib et al., JCO Interviews Dr. James A. McNamura, Jr., on the Frankel Appliance: Part 2: Clinical Management:, Journal of Clinical Orthodontics; 16(6), Jun. 1982, pp. 390-407; retrieved from the internet (http://www.jco-online.com/archive/print_article.asp?Year=1982&Month=06&ArticleNum+ ) on Mar. 9, 2005.

Grayson, "New Methods for Three Dimensional Analysis of Craniofacial Deformity", Symposium: Computerized Facial Imaging in Oral and Maxillofacial Surgery; American Association of Oral and Maxillofacial Surgeons; 48(8) suppl 1; pp. 5-6; Sep. 13, 1990.

Guess et al. "Computer Treatment Estimates In Orthodontics and Orthognathic Surgery" Journal of Clinical Orthodontics; 23(4); pp. 262-268; 11 pages; (Author Manuscript); Apr. 1989.

Heaven et al.; Computer-Based Image Analysis of Artificial Root Surface Caries; Abstracts of Papers #2094; Journal of Dental Research; vol. 70, Special Issue; p. 528; (Abstract Only); Apr. 17-21, 1991.

Highbeam Research, "Simulating stress put on jaw. (ANSYS Inc.'s finite element analysis software)" Nov. 1, 1996, 2 pages; retrieved from the Internet (http://static.highbeam.eom/titoolingampproduction/november011996/simulatingstressputonfa . . . ); on Nov. 5, 2004.

Hikage, "Integrated Orthodontic Management System for Virtual Three-Dimensional Computer Graphic Simulation and Optical Video Image Database for Diagnosis and Treatment Planning" Journal of Japan KA Orthodontic Society; 46(2); pp. 248-269; 56 pages; (English Translation Included); Feb. 26, 1987.

Hoffmann et al., "Role of Cephalometry for Planning of Jaw Orthopedics and Jaw Surgery Procedures", Informatbnen, pp. 375-396; (English Abstract Included); Mar. 1991.

Hojjatie et al., Three-Dimensional Finite Element Analysis of Glass-Ceramic Dental Crowns; Journal of Biomechanics; 23(11); pp. 1157-1166; Jan. 1990.

JCO Interviews, "Craig Andreiko , DDS, MS on the Elan and Orthos Systems; Interview by Dr. Larry W. White", Journal of Clinical Orthodontics; 28(8); pp. 459-468; 14 pages; (Author Manuscript); Aug. 1994.

JCO Interviews; "Dr. Horner W. Phillips on Computers in Orthodontic Practice, Part 2", Journal of Clinical Orthodontics; 17(12); pp. 819-831; 19 pages; Dec. 1983.

Jerrold, "The Problem, Electronic Data Transmission and the Law", American Journal of Orthodontics and Dentofacial Orthopedics; 113(4 ); 5 pages; (Author Manuscript); Apr. 1998.

Jones et al.; An Assessment of the Fit of a Parabolic Curve to Pre- and Post-Treatment Dental Arches; British Journal of Orthodontics; 16(2); pp. 85-93; May 1989.

Kamada et al., "Case reports on Tooth Positioners Using LTV Vinyl Silicone Rubber", J. Nihon University School of Dentistry; 26(1); pp. 11-29; (year of pub. Sufficiently earlier than effective US filing date and any foreign priority date) 1984.

Kamada et al. "Construction of Tooth Positioners with LTV Vinyl Silicone Rubber and Some Case Reports", J. Nihon University School of Dentistry; 24(1); pp. 1-27; (year of pub. Sufficiently earlier than effective US filing date anda ny foreign priority date) 1982.

Kanazawa et al., "Three-Dimensional Measurements of the Occlusal Surfaces of Upper Molars in a Dutch Population", Journal of Dental Research; 63(11); pp. 1298-1301; Nov. 1984.

Kesling et al., "The Philosophy of the Tooth Positioning Appliance", American Journal of Orthodontics and Oral Surgery; 31 (6); pp. 297-304; Jun. 1945.

Kesling, "Coordinating the Predetermined Pattern and Tooth Positioner with Conventional Treatment", American Journal of Orthodontics and Oral Surgery; 32(5); pp. 285-293; May 1946.

(56) References Cited

OTHER PUBLICATIONS

Kleeman et al., "The Speed Positioner", J. Clin. Orthod.; 30(12); pp. 673-680; Dec. 1996.
Kochanek et al., "Interpolating Splines with Local Tension, Continuity and Bias Control", Computer Graphics; 18(3); pp. 33-41; Jan. 1, 1984.
Kunii et al., "Articulation Simulation for an Intelligent Dental Care System" Displays; 15(3); pp. 181-188; Jul. 1994.
Kuroda et al., "Three-Dimensional Dental Cast Analyzing System Using Laser Scanning", American Journal of Orthodontics and Dentofacial Orthopedics; 11 0(4 ); pp. 365-369; Oct. 1996.
Laurendeau et al., "A Computer-Vision Technique for the Acquisition and Processing of 3-D Profiles of Dental Imprints: An Application in Orthodontics", IEEE Transactions on Medical Imaging; 1 0(3); pp. 453-461; Sep. 1991.
Leinfelder et al., "A New Method for Generating Ceramic Restorations: a CAD-CAM System" Journal of the American Dental Association; 118(6); pp. 703-707; Jun. 1989.
Manetti et al., "Computer-Aided Cefalometry and New Mechanics in Orthodontics" Fortschr Kieferorthop; 44; pp. 370-376; 8 pages; (English Article Summary Included); (year of pub. sufficiently earlier than effective US filing date and any foreign priority date) 1983.
McCann; Inside the ADA; J. Amer. Dent. Assoc, 118:286-294; Mar. 1989.
McNamara et al., "Invisible Retainers", J. Clin Orthod.; pp. 570-578; 11 pages; (Author Manuscript); Aug. 1985.
McNamara et al.; "Orthodontic and Orthopedic Treatment in the Mixed Dentition", Needham Press; pp. 347-353; Jan. 1993.
Moermann et al, "Computer Machined Adhesive Porcelain Inlays: Margin Adaptation after Fatigue Stress", IADR Abstract 339; J. Dent. Res.; 66(a):763; (Abstract Only); (year of pub. sufficiently earlier than effective US filing date and any foreign priority date) 1987.
Moles, "Correcting Mild Malalignments—As Easy As One, Two, Three", AOA/Pro Corner; 11 (2); 2 pages; (year of pub. sufficiently earlier than effective US filing date and any foreign priority date) 2002.
Mormann et al.; "Marginale Adaptation von adhasuven Porzellaninlays in vitro", Separatdruck aus:Schweiz. Mschr. Zahnmed.; 95; pp. 1118-1129: 8 pages; (Machine Translated English Abstract); (year of pub. sufficiently earlier than effective US filing date and any foreign priority date); 1985.
Nahoum, "The Vacuum Formed Dental Contour Appliance", N.Y. State Dent. J.; 30(9); pp. 385-390; Nov. 1964.
Nash, "CEREC CAD/CAM Inlays: Aesthetics and Durability in a Single Appointment", Dentistry Today; 9(8); pp. 20, 22-23 and 54; Oct. 1990.
Nishiyama et al., "A New Construction of Tooth Repositioner by LTV Vinyl Silicone Rubber", Journal of Nihon University School of Dentistry; 19(2); pp. 93-102 (year of pub. Sufficiently earlier than effective US filing date and any foreign priority date) 1977.
Paul et al.; "Digital Documentation of Individual Human Jaw and Tooth Forms for Applications in Orthodontics; Oral Surgery and Forensic Medicine" Proc. of the 24th Annual Conf. of the IEEE Industrial Electronics Society (IECON '98); vol. 4; pp. 2415-2418; Sep. 4, 1998.
Pinkham, "'Foolish' Concept Propels Technology", Dentist, 3 pages, Jan./Feb. 1989.
Pinkham, "Inventor's CAD/CAM May Transform Dentistry", Dentist; pp. 1 and 35, Sep. 1990.
Ponitz, "Invisible Retainers", American Journal of Orthodics, 59(3); pp. 266-272; Mar. 1971.
Procera Research Projects; Procera Research Projects 1993. Abstract Collection; 23 pages; (year of pub. sufficiently earlier than effective US filing date and any foreign priority date) 1993.
Proffit et al.; "The First Stage of Comprehensive Treatment: Alignment and Leveling", Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http:llwww.essix.comlmagazineldefaulthtml) on Aug. 13, 1997.
Redmond et al.; "Clinical Implications of Digital Orthodontics", American Journal of Orthodontics and Dentofacial Orthopedics; 117(2); pp. 240-242; Feb. 2000.
Rekow et al., "CAD/CAM for Dental Restorations—Some of the Curious Challenges", IEEE Transactions on Biomedical Engineering; 38(4); pp. 314-318; Apr. 1991.
Rekow et al., "Comparison of Three Data Acquisition Techniques for 3-D Tooth Surface Mapping", Annual International Conference of the IEEE Engineering in Medicine and Biology Society; 13(1); pp. 344-345 (year of pub. sufficiently earlier than effective US filing date and any foreign priority date) 1991.
Rekow, "A Review of the Developments in Dental CAD/CAM Systems", Current Opinion in Dentistry; pp. 25-33; Jun. 1992.
Rekow, "CAD/CAM in Dentistry: A Historical Perspective and View of the Future", Journal Canadian Dental Association; 58(4); pp. 283, 287-288; Apr. 1992.
Rekow, "Computer-Aided Design and Manufacturing in Dentistry: A Review of the State of the Art", Journal of Prosthetic Dentistry; 58(4 ); pp. 512-516; Dec. 1987.
Rekow, "Dental CAD-CAM Systems: What is the State of the Art?", The Journal of the American Dental Association; 122(12); pp. 43-48; Dec. 1991.
Rekow, "Feasibility of an Automated System for Production of Dental Restorations", Ph.D. Thesis; Univ. of Minnesota, 250 pages, Nov. 1988.
Richmond et al., "The Development of a 3D Cast Analysis System", British Journal of Orthodontics; 13(1 ); pp. 53-54; Jan. 1986.
Richmond et al., "The Development of the PAR Index (Peer Assessment Rating): Reliability and Validity", The European Journal of Orthodontics; 41(2); pp. 125-139; Apr. 1992.
Richmond, "Recording the Dental Cast In Three Dimensions", American Journal of Orthodontics and Dentofacial Orthopedics; 92(3); pp. 199-206; Sep. 1987.
Rudge, "Dental Arch Analysis: Arch Form, A Review of the Literature" European Journal of Orthodontics; 3(4 ); pp. 279-284; Jan. 1981.
Sakuda et al. "Integrated Information-Processing System In Clinical Orthodontics: An Approach with Use of a Computer Network System", American Journal of Orthodontics and Dentofacial Orthopedics; 101 (3); pp. 210-220; 20 pages; (Author Manuscript) Mar. 1992.
Schellhas et al., "Three-Dimensional Computed Tomography in Maxillofacial Surgical Planning", Archives of Otolaryngology—Head and Neck Surgery; 114(4); pp. 438-442; Apr. 1988.
Schroeder et al; Eds. "The Visual Toolkit", Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday, "Minimizing finishing problems with the mini-positioner", American Journal of Orthodontics; 59(6); pp. 596-599; Jun. 1971.
Siemens; CEREC—"Computer-Reconstruction,"High Tech in der Zahnmedizin, 15 pages; (Includes Machine Translation); (year of pub. sufficiently earlier than effective US filing date and any foreign priority date); 2004.
Sinclair, "The Readers' Corner", Journal of Clinical Orthodontics; 26(6); pp. 369-372; 5 pages; retrived from the internet (http://www.jco-online.comlarchive/print_article .asp?Year= 1992&Month=06 &ArticleNum=); Jun. 1992.
Stoll et al.; "Computer-aided Technologies in Dentistry", Dtsch Zahna'rztl Z 45, pp. 314-322; (English Abstract Included); (year of pub. sufficiently earlier than effective US filing date and any foreign priority date) 1990.
Sturman, "Interactive Keyframe Animation of 3-D Articulated Models", Proceedings Graphics Interface '84; vol. 86; pp. 35-40; May-Jun. 1984.
The American Heritage, Stedman's Medical Dictionary; "Gingiva"; 3 pages; retrieved from the interent (http://reference.com/search/search?q=gingiva) on Nov. 5, 2004.

(56) References Cited

OTHER PUBLICATIONS

TRUAX, "Truax Clasp-Less(TM) Appliance System", The Functional Orthodontist; 9(5); pp. 22-24, 26-8; Sep.-Oct. 1992.

TRU-TATN Orthodontic & Dental Supplies, Product Brochure, Rochester, Minnesota 55902, 16 pages; (year of pub. sufficiently earlier than effective US filing date and any foreign priority date) 1996.

U.S. Department of Commerce, National Technical Information Service, "Holodontography: An Introduction to Dental Laser Holography", School of Aerospace Medicine Brooks AFB Tex; Mar. 1973, 37 pages.

Schmidt, et al. "Automated Crown Replication Using Solid Photography SM", National Technical Information Service, Solid Photography Inc., Melville NY,; Oct. 1977; 19 pages AKA U.S. Department of Commerce, national Technical Information Service; "Automated Crown Replication . . . ."

Van Der Linden, "A New Method to Determine Tooth Positions and Dental Arch Dimensions", Journal fo Dental Research; 51(4); p. 1104; Jul.-Aug. 1972.

Van Der Linden et al, "Three-Dimensional Analysis of Dental Casts by Means of the Optocom", Journal of Dental Research; 51 (4 ); p. 11 00; Jul.-Aug. 1972.

Van Der Zel, "Ceramic-Fused-to-Metal Restorations with a New CAD/Cam System", Quintessence International; 24 (A); pp. 769-778; (year of pub. Sufficiently earlier than effective US filing date and any foreign priority date); 1993.

Varady et al.; "Reverse Engineering of Geometric Models—An Introduction", Computer-Aided Design; 29(4 ); pp. 255-268; 29 pages; (Author Manuscript); May 13, 1996.

Verstreken et al., "An Image-Guided Planning System for Endosseous Oral Implants", IEEE Transactions on Medical Imaging; 17(5); pp. 842-852; Oct. 1998.

Warunek et al., "Physical and Mechanical Properties of Elastomers in Orthodonic Positioners", American Journal of Orthodontics and Dentofacial Orthopedics; 95(5); pp. 388-400; 21 pages; (Author Manuscript); May 1989.

Warunek et.al., "Clinical Use of Silicone Elastomer Applicances", JCO; 23 (10); pp. 694-700; Oct. 1989.

Wells, "Application of the Positioner Appliance in Orthodontic Treatment", American Journal of Orthodontics; 58( 4 ); pp. 351-366; Oct. 1970.

Wishan, "New Advances in Personal Computer Applications for Cephalometric Analysis, Growth Prediction, Surgical Treatment Planning and Imaging Processing", Symposium: Computerized Facial Imaging in Oral and Maxilofacial Surgery; p. 5; Presented on Sep. 13, 1990.

Williams, "Dentistry and CAD/Cam: Another French Revolution", J. Dent. Practice Admin.; 4(1); pp. 2-5 Jan./Mar. 1987.

Williams, "The Switzerland and Minnesota Developments in CAD/CAM", Journal of Dental Practice Administration; 4 (2); pp. 50-55; Apr./Jun. 1987.

WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.

Xia et al., "Three-Dimensional Virtual-Reality Surgical Planning and Soft-Tissue Prediction for Orthognathic Surgery", IEEE Transactions on Information Technology in Biomedicine; 5(2); pp. 97-107; Jun. 2001.

Yamamoto et al., "Optical Measurement of Dental Cast Profile and Application to Analysis of Three-Dimensional Tooth Movement in Orthodontics", Front. Med. Biol. Eng., 1(2); pp. 119-130; (year of pub. sufficiently earlier than effective US filing date and any foreign priority date); 1988.

Yamamoto et al., "Three-Dimensional Measurement of Dental Cast Profiles and Its Applications to Orthodontics", Conf. Proc. IEEE Eng. Med. Bioi. Soc.; 12(5); pp. 2052-2053; Nov. 1990.

Yamany et al., "A System for Human Jaw Modeling Using Intra-Oral Images", Proc. Of the 20th Annual Conf. of the IEEE Engineering in Medicine and Biology Society; vol. 2; pp. 563-566; Oct. 1998.

Yoshii, "Research on a New Orthodontic Appliance: The Dynamic Positioner (D.P.); I. The D.P. Concept and Implementation of Transparent Silicone Resin (Orthocon)"; Nippon Dental Review; 452; pp. 61-74; 32 pages; (Author Manuscript); Jun. 1980.

Yoshii, "Research on a New Orthodontic Appliance: The Dynamic Positioner (D.P.); II. The D.P. Manufacturing Procedure and Clinical Applications", Nippon Dental Review; 454; pp. 107-130; 48 pages; (Author Manuscript); Aug. 1980.

Yoshii, "Research on a New Orthodontic Appliance: The Dynamic Positioner (D.P.)—III. The General Concept of the D.P. Method and Its Therapeutic Effect, Part 1, Dental and Functional Reversed Occlusion Case Reports", Nippon Dental Review; 457; pp. 146-164; 43 pages; (Author Manuscript); Nov. 1980.

Yoshii, "Research on a New Orthodontic Appliance: The Dynamic Positioner (D.P.); III—The General Concept of the D.P. Method and Its Therapeutic Effect, Part 2. Skeletal Reversed Occlusion Case Reports", Nippon Dental Review; 458; pp. 112-129; 40 pages; (Author Manuscript); Dec. 1980.

Sirona Dental Systems GmbH, CEREC 3D, Manuel utilisateur, Version 2.0X (in French), 2003, 114 pages.

AADR, American Association for Dental Research; Summary of Activities; Los Angeles, CA; p. 195; Mar. 20-23, 1980.

Alcaniz et al., "An Advanced System for the Simulation and Planning of Orthodontic Treatments" Visualization in Biomedical Computing, 4th Intl. Conf, VBC '96, Sep. 22-25, 1996, pp. 511-520, Springer-Verlag, Hamburg, Germany.

Alexander et al., "The DigiGraph Work Station Part 2 Clinical Management", J. Clin. Orthod., Jul. 1990, 12 pages.

Allesee Orthodontic Appliances: "Important Tip About Wearing the Red White & Blue Active Clear Retainer System", Allesee Orthodontic Appliances—Pro Lab; 1 page; (year of pub. Sufficiently earlier than effecitve US filing date and any foreign priroirty date); 1998.

Allesee Orthodontic Appliances; The Choice is Clear: Red, White & Blue . . . the Simple, Affordable, No-Braces Treatment; (Patient Information); retrieved from the internet (http://ormco.com/aoa/appliancesservices/RWB/patients.html); 2 pages on May 19, 2003.

Allesee Orthodontic Appliances; The Choice is Clear: Red, White & Blue . . . the Simple, Affordable, No-Braces Treatment; (product information for doctors); retrieved from the internet (http://ormco.com/aoa/appliancesservices/RWB/doctrohtml); 5 pages on May 19, 2003.

Allesee Orthodontic Appliances; The Choice is Clear: Red, White & Blue . . . the Simple, Affordable, No-Braces Treatment; (product information), 6 pages; (year of pub. Sufficiently earlier than effective US filing date and any foreign priority date) 2003.

Allesee Orthodontic Appliances; The Red, White & Blue Way to Improve Your Smile; (information for patients), 2 pages; (year of pub. Sufficiently earlier than effective US filing date and any foreign priority date) 1992.

Allesee Orthodontic Appliances; You may be a candidate for this invisible no-braces treatment; product information for patients; 2 pages; (year of pub. Sufficiently earlier than effective US filing date and any foreign priority date) 2002.

Allesee Orthodontic Applicances: Dura ClearTM; Product information; 1 page; (year of pub. Sufficiently earlier than effective US filing and any foreign priority date) 1997.

Altschuler et al., Analysis of 3-D Data for Comparative 3-D Serial Growth Pattern Studies of Oral-Facial Structures; IADR Abstracts, Program and Abstracts of Papers, 57th General Session, AIDR Annual Session, Mar. 29, 1979-Apr. 1, 1979, New Orleans Marriot; Journal of Dental Research; vol. 58, Special Issue A, p. 221; Jan. 1979.

Altschuler et al., Laser Electro-Optic System for Rapid Three-Dimensional (3D) Topographic Mapping of Surfaces; Optical Engineering; Dec. 1981, pp. 953-961, vol. 20(6).

(56) References Cited

OTHER PUBLICATIONS

Altschuler et al., "Measuring Surfaces Space-Coded by a Laser-Projected Dot Matrix" SPIE Imaging Applications for Automated Industrial Inspection and Assembly; Oct. 10, 1979, pp. 187-191, vol. 182.
Altschuler; 3D Mapping of Maxillo-Facial Prosthesis; AADR Abstract #607; 1 page, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, "The Six Keys to Optimal Occlusion" Straight Wire, Chapter 3, L.A. Wells; pp. 13-24; (year of pub. sufficiently earlier than effective US filing date and any foreign priority date) 1989.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972, vol. 48, No. 2.
Baumrind et al., "A Stereophotogrammetric System for the Detection of Prosthesis Loosening in Total Hip Arthroplasty", NATO Symposium on Applications of Human Biostereometrics; SPIE; vol. 166; pp. 112-123; Jul. 9-13, 1978.
Baumrind "A System for Craniofacial Mapping Through the Integration of Data from Stereo X-Ray Films and Stereo Photographs", an invited paper submitted to the 1975 American Society of Photogram Symposium on Close-Range Photogram Systems; University of Illinois; pp. 142-166; Aug. 26-30, 1975.
Baumrind, "Integrated Three-Dimensional Craniofacial Mapping: Background, Principles, and Perspectives", Seminars in Orthodontics; 7(4 ); pp. 223-232; Dec. 2001.
Begole et al.; A Computer System for the Analysis of Dental Casts; The Angle Orthodontist; 51(3); pp. 252-258, Jul. 1981.
Bernard et al, "Computerized Diagnosis in Orthodontics for Epidemiological Studies: A ProgressReport" (Abstract Only), J. Dental Res. Special Issue, vol. 67, p. 169, paper presented at International Association for Dental Research 66th General Session, Montreal Canada; Mar. 9-13, 1988.
Bhatia et al., "A Computer-Aided Design for Orthognathic Surgery", British Journal of Oral and Maxillofacial Surgery; 22(4 ); pp. 237-253; Aug. 1, 1984.
Biggerstaff et al., "Computerized Analysis of Occlusion in the Postcanine Dentition", American Journal of Orthodontics; 61 (3); pp. 245-254; Mar. 1972.
Biggerstaff, "Computerized Diagnostic Setups and Simulations", Angle Orthodontist; 40(I); pp. 28-36; Jan. 1970.
Biostar Operation & Training Manual. Great Lakes Orthodontics, Ltd. 199 Fire Tower Drive, Tonawanda, New York. 14150-5890, 20 pages; (year of pub. sufficiently earlier than effective US filing date and any foreign priority date) 1990.
Blu et al.; "Linear Interpolation Revitalized", IEEE Transactions on Image Processing; 13(5); pp. 710-719; May 2004.
Bourke, "Coordinate System Transformation", 2 pages, Jun. 1996, retrieved from the internet (http://local.wasp.uwa.edu.au/~pbourke/protection/coords/) on Sep. 19, 2006.
Boyd et al., "Three Dimensional Diagnosis and Orthodontic Treatment of Complex Malocclusions With the Invisalipn Appliance", Seminars in Orthodontics; 7(4); pp. 274-293; Dec. 2001.
Brandestini et al. "Computer Machined Ceramic Inlays: In Vitro Marginal Adaptation", J. Dent. Res. Special Issue; (Abstract 305); vol. 64; p. 208; (year of pub. sufficiently earlier than effective US filing date and any foreign priority date) 1985.
Brook et al., "An Image Analysis System for the Determination of Tooth Dimensions from Study Casts: Comparison with Manual Measurements of Mesio-distal Diameter", Journal of Dental Research; 65(3); pp. 428-431: Mar. 1986.
Burstone et al., "Precision Adjustment of the Transpalatal Lingual Arch: Computer Arch Form Predetermination", American Journal of Orthodontics; 79(2);pp. 115-133; Feb. 1981.
Burstone; "Dr. Charles J. Burstone on The Uses of the Computer in Orthodontic Practice (Part 1 )"; Journal of Clinical Orthodontics; 13(7); pp. 442-453; (interview); Jul. 1979.
Burstone; "Dr. Charles J. Burstone on The Uses of the Computer in Orthodontic Practice (Part 2)"; Journal of Clinical Orthodontics; 13(8); pp. 539-551 (interview); Aug. 1979.
"Cardinal Industrial Finishes for Liquid and Powder Coatings", The Powder Coating Isntitute; 6 pages; retrieved from the internet (http://www.cardinalpaint.com/powder%20coatings.htm) on Aug. 25, 2000.
Carnaghan et al., "An Alternative to Holograms for the Portrayal of Human Teeth", 4th Int'l. Conf. on Holographic Systems, Components and Applications; pp. 228-231; Sep. 15, 1993.
Chaconas et al, "The DigiGraph Work Station, Part 1, Basic Concepts"; Journal of Clinical Orthodontics; 24(6); pp. 360-367; (Author Manuscript); Jun. 1990.
Chafetz et al., "Subsidence of the Femoral Prosthesis, A Stereophotogrammetric Evaluation", Clinical Orthopaedics and Related Research; No. 201; pp. 60-67; Dec. 1985.
Chiappone, "Constructing the Gnathologic Setup and Positioner", Journal of Clinical Orthodontics; 14(2); pp. 121-133; Feb. 1980.
Cottingham, "Gnathologic Clear Plastic Positioner", American Journal of Orthodontics; 55(1 ); pp. 23-31; Jan. 1969.
Crawford; CAD/CAM in the Dental Office: Does It Work?; Canadian Dental Journal; 57(2); pp. 121-123 Feb. 1991.
Crawford, Computers in Dentistry: Part 1: CAD/CAM: The Computer Moves Chairside, Part 2: F. Duret—A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton, "Correcting Malaligned Mandibular Incisors with Removable Retainers", Journal of Clinical Orthodontics; 30(7); pp. 390-395; Jul. 1996.
Curry et al., "Integrated Three-Dimensional Craniofacial Mapping at the Craniofacial Research Instrumentation Laboratory / University of the Pacific", Seminars in Orthodontics; 7(4 ); pp. 258-265; Dec. 2001.
Cutting et al., "Three-Dimensional Computer-Assisted Design of Craniofacial Surgical Procedures: Optimization and Interaction with Cephalometric and CT-Based Models", Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al., "Three-Dimensional Large Displacement Analysis of Orthodontic Appliances", Journal of Biomechanics; 9( 12); pp. 793-801; Jan. 1976.
Dental Institute University of Zurich Switzerland; Program for International Symposium on Computer Restorations: State of the Art of the CEREC-Method; 2 pages; May 1991.

\* cited by examiner

PARAMETRIC BLURRING OF COLORS FOR TEETH IN GENERATED IMAGES

TECHNICAL FIELD

Embodiments of the present disclosure relate to the field of dentistry and, in particular, to a system and method for generating simulated images of dental treatment outcomes with accurate coloration.

BACKGROUND

For both dental practitioners and patients who are considering undergoing orthodontic treatment it can be helpful to generate images that show what the patients' teeth will look like after treatment is performed. However, available techniques for generating simulated images that show orthodontic treatment outcomes of the patients' teeth are often unable to generate images with accurate coloration of the patients' teeth.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
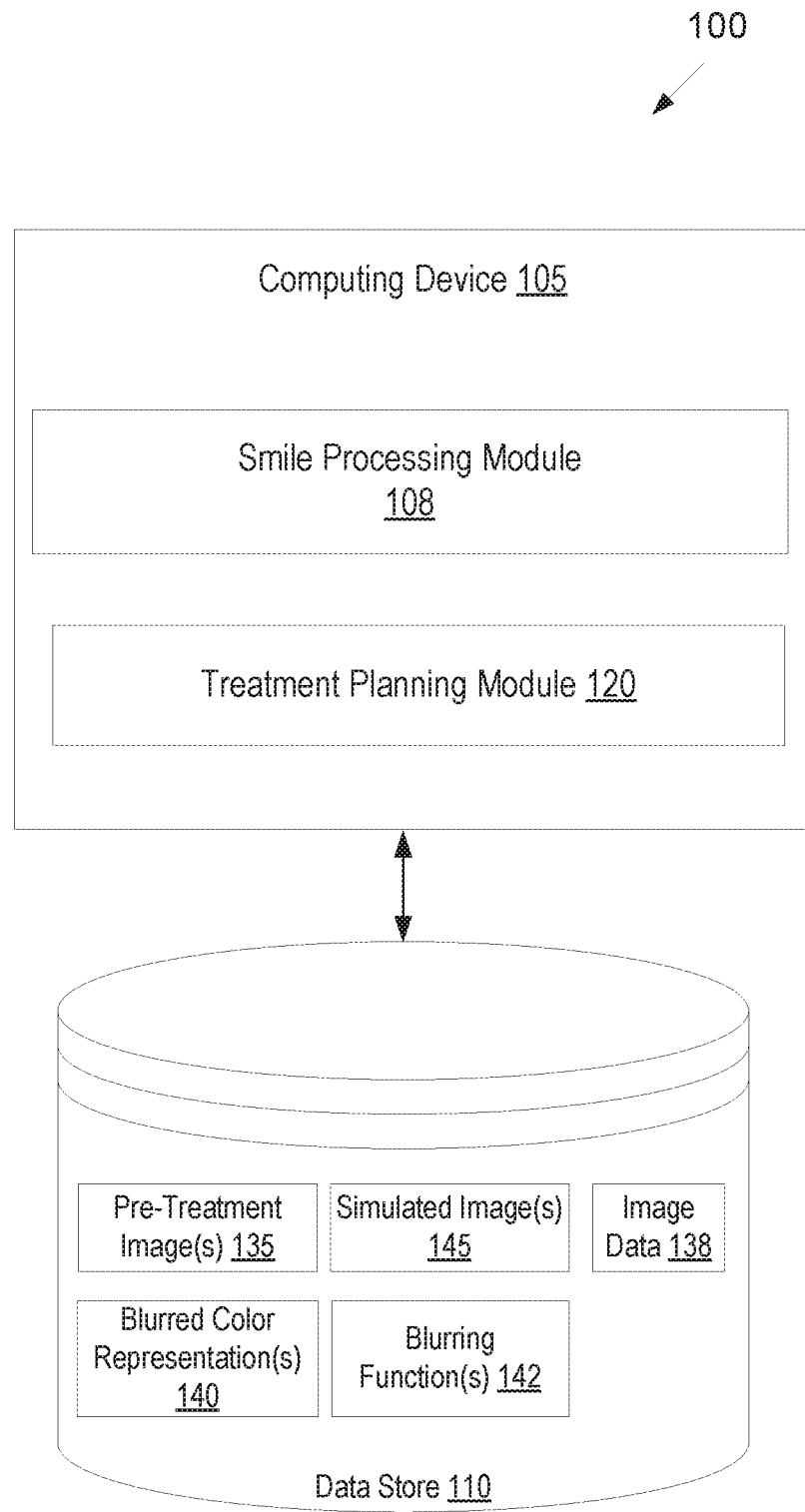
FIG. 1 illustrates one embodiment of a treatment planning system, in accordance with an embodiment.

Described herein are methods and systems for generating color data for use in the generation of accurate simulated images as well as methods and systems for generating such accurate simulated images based on the color data, in accordance with embodiments of the present disclosure. In some embodiments, the color data is a blurred color representation of a patient's teeth. The blurred color representation of the patient's teeth may be generated and combined with image data comprising a sketch or contours of the patient's teeth and/or gingiva to generate a realistic simulated image with accurate color data and accurate contours of the patient's teeth. The image data comprising the contours of the teeth and gingiva may be generated from a treatment plan (e.g., an orthodontic treatment plan) and may show the contours of the teeth and gingiva after treatment has been performed. Embodiments enable an accurate simulated post-treatment image of a patient's smile to be generated based on a current image of the patient's smile as generated, for example, by a camera or image sensor. As used herein, simulated images include images that are not generated by image sensors.

Consumer smile simulations are simulated images generated for consumers (e.g., patients) that show how the smiles of those consumers will look after some type of dental treatment (e.g., such as orthodontic treatment). Clinical smile simulations are generated simulated images used by dental professionals (e.g., orthodontists, dentists, etc.) to make assessments on how a patient's smile will look after some type of dental treatment. For both consumer smile simulations and clinical smile simulations, a goal is to produce a post-treatment realistic photo rendering of a patient's smile that may be used by a patient, potential patient and/or dental practitioner to view a treatment outcome. For both use cases, the general process of generating the simulated image showing the post-treatment smile includes taking a picture of the patient's current smile, simulating or generating a treatment plan for the patient that indicates post-treatment positions and orientations for teeth and gingiva, and converting data from the treatment plan back into a new simulated image showing the post-treatment smile.

In some embodiments, current consumer and clinical smile simulations are generated by using a generative adversarial network (GAN) to texturize a rendered image (image data showing contours but possibly lacking color data such as color data for teeth) in order to produce realistic-looking teeth. To successfully texturize the rendered image and add accurate color data to the rendered image, a blurred color image and the image data showing the contours may be input to the GAN in order to generate the correct coloration for a particular individual. Other techniques for generating a blurred color representation of the teeth (e.g., such as Gaussian blurring) may generate spatially localized color data, which darkens areas of the blurred image where there were no teeth or where the teeth were recessed or discolored. This may result in the GAN producing tooth colorations for the rendered image that are also discolored causing the teeth to look either overly translucent or out of place.

In embodiments, global functions of the tooth coloration or intensity in a given color space are generated. The global functions may be, for example, parametric functions (e.g., polynomial functions such as biquadratic functions). Use of the global functions for tooth coloration results in a GAN texturization which is realistically colored in all regions of the rendered teeth. The global functions can be created using all points labeled as teeth in the original image in some embodiments. In further embodiments, the global functions may be created using an outlier removal algorithm, such as RANSAC.

Using a blurred color image (e.g., a blurred color representation of teeth and/or gingiva) as an input to the GAN to perform the texturing work causes the GAN to produce a photo-realistic post-treatment image of the smile with increased accuracy. Traditional blurring techniques are inherently local. However, the blurring techniques described in embodiments herein are global blurring techniques that result in improved realism and/or better image quality for simulated images (e.g., where tooth coloring appears more realistic and teeth appear straighter). The global blurring technique applied in embodiments a) is global across the teeth region in the mouth, b) identifies the proper color of each tooth even in areas where there are no current teeth, c) captures the color changes that occur naturally due to lighting changes and the location along the mouth arch, d) ignores local artifacts and e) can be configured to work in the presence of noise by using outlier removal. Ultimately, the global blurring function described in embodiments enables a neural network such as a GAN to produce improved and more accurate texturing in simulated images of patient smiles.

In one embodiment, a processing device receives a first image of a mouth. The processing device determines, from the first image, a first region of the first image comprising a representation of teeth, wherein the first region comprises a first set of pixel locations in the first image. The processing device generates a first parametric function for a first color channel based on intensities of the first color channel at the pixel locations in the first set of pixel locations, wherein the first parametric function comprises a first variable for a first image axis and a second variable for a second image axis. The processing device may additionally generate a second parametric function for a second color channel, a third parametric function for a third color channel and/or a fourth parametric function for a fourth color channel. The processing device receives image data comprising new contours of the mouth, wherein one or more of the teeth have a different position in the image data than in the first image. The processing device determines a second region comprising the teeth in the image data, wherein the second region comprises a second set of pixel locations for the teeth that is different than the first set of pixel locations. The processing device then generates a new image based on the image data and the first parametric function (and possibly the second and third parametric functions), wherein a shape of the teeth is based on the image data and a color of the teeth is based on applying the first parametric function (and optionally the second and third parametric functions) to the second set of pixel locations for the teeth. In some embodiments, the processing device generates a blurred color representation of the teeth by applying the first parametric function (and optionally the second and third parametric functions) to the second set of pixel locations for the teeth. The processing device may then process the blurred color representation of the teeth and the received image data using a neural network to generate the new image. In some embodiments the neural network is a generative adversarial network (GAN) such as a picture to picture GAN (also known as an image to image GAN).

FIG. 1 illustrates one embodiment of a treatment planning system 100. In one embodiment, the treatment planning system 100 includes a computing device 105 and a data store 110. The treatment planning system 100 may additionally include, or be connected to, an image capture device such as a camera and/or an intraoral scanner. The computing device 105 may include physical machines and/or virtual machines hosted by physical machines. The physical machines may be rackmount servers, desktop computers, or other computing devices. The physical machines may include a processing device, memory, secondary storage, one or more input devices (e.g., such as a keyboard, mouse, tablet, speakers, or the like), one or more output devices (e.g., a display, a printer, etc.), and/or other hardware components. In one embodiment, the computing device 105 includes one or more virtual machines, which may be managed and provided by a cloud provider system. Each virtual machine offered by a cloud service provider may be hosted on one or more physical machine. Computing device 105 may be connected to data store 110 either directly or via a network. The network may be a local area network (LAN), a public wide area network (WAN) (e.g., the Internet), a private WAN (e.g., an intranet), or a combination thereof.

Data store 110 may be an internal data store, or an external data store that is connected to computing device 105 directly or via a network. Examples of network data stores include a storage area network (SAN), a network attached storage (NAS), and a storage service provided by a cloud provider system. Data store 110 may include one or more file systems, one or more databases, and/or other data storage arrangement.

The computing device 105 may receive one or more images from an image capture device or from multiple image capture devices. The image capture device may be or include a charge-coupled device (CCD) sensor and/or a complementary metal-oxide semiconductor (CMOS) sensor. The image capture device may provide images or video to the computing device 105 for processing. For example, the image capture device 160 may provide images to the computing device 105 that the computing device analyzes to identify a patient's mouth, a patient's face, a patient's dental arch, or the like. In some embodiments, the images captured by image capture device may be stored in data store 110 as pre-treatment images 135. For example, pre-treatment images 135 may be stored in data store 110 as a record of patient history or for computing device 105 to use for analysis of the patient and/or for generation of simulated post-treatment images. The image capture device may transmit the discrete images and/or video to the computing device 105, and computing device 105 may store the pre-treatment images 135 in data store 110. In some embodiments, the pre-treatment images 135 include two-dimensional data.

Computing device includes a smile processing module 108 and a treatment planning module 120 in embodiments. The treatment planning module 120 is responsible for generating a treatment plan that includes a treatment outcome for a patient. The treatment plan may include and/or be based on an initial 2D and/or 3D image of the patient's dental arches. For example, the treatment planning module 120 may receive 3D intraoral images of the patient's dental arches, and may stitch the 3D images together to create a virtual 3D model of the dental arches. The treatment planning module 120 may then determine current positions and orientations of the patient's teeth from the virtual 3D model and determine target final positions and orientations for the patient's teeth represented as a treatment outcome. The treatment planning module 120 may then generate a virtual 3D model showing the patient's dental arches at the end of treatment as well as one or more virtual 3D models showing the patient's dental arches at various intermediate stages of treatment. Alternatively, or additionally, the treatment planning module 120 may generate one or more 3D images and/or 2D images showing the patient's dental arches at various stages of treatment.

By way of non-limiting example, a treatment outcome may be the result of a variety of dental procedures. Such dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity, or a real or virtual model thereof, or directed to the design and preparation of the dental site to receive such a prosthesis. A prosthesis may include any restoration such as implants, crowns, veneers, inlays, onlays, and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances. Any of treatment outcomes or updates to treatment outcomes described herein may be based on these orthodontic and/or dental procedures. Examples of orthodontic treatments are treatments that reposition the teeth, treatments such as mandibular advancement that manipulate the lower jaw, treatments such as palatal expansion that widen the upper and/or lower palate, and so on. For example, an update to a treatment outcome may be generated by interaction with a user to perform one or more procedures to one or more portions of a patient's dental arch or mouth. Planning these orthodontic procedures and/or dental procedures may be facilitated by the AR system described herein.

A treatment plan for producing a particular treatment outcome may be generated by first generating an intraoral scan of a patient's oral cavity. From the intraoral scan a virtual 3D model of the upper and/or lower dental arches of the patient may be generated. A dental practitioner may then determine a desired final position and orientation for the patient's teeth on the upper and lower dental arches, for the patient's bite, and so on. This information may be used to generate a virtual 3D model of the patient's upper and/or lower arches after orthodontic treatment. This data may be used to create an orthodontic treatment plan. The orthodontic treatment plan may include a sequence of orthodontic treatment stages. Each orthodontic treatment stage may adjust the patient's dentition by a prescribed amount, and may be associated with a 3D model of the patient's dental arch that shows the patient's dentition at that treatment stage.

In some embodiments, the treatment planning module 120 may receive or generate one or more virtual 3D models, virtual 2D models, 3D images, 2D images, or other treatment outcome models and/or images based on received intraoral images. For example, an intraoral scan of the patient's oral cavity may be performed to generate an initial virtual 3D model of the upper and/or lower dental arches of the patient. Treatment planning module 120 may then determine a final treatment outcome based on the initial virtual 3D model, and then generate a new virtual 3D model representing the final treatment outcome.

Smile processing module 180 may generate simulated post-treatment images of patient smiles. To generate a simulated post-treatment image, smile processing module 180 generates one or more blurring functions. This may include setting up the functions, and then solving for the one or more blurring functions using data from an initial pre-treatment image 135. In some embodiments, a first set of blurring functions is generated (e.g., set up and then solved for) with regards to a first region depicting teeth in the pre-treatment image 135 and a second set of blurring functions is generated with regards to a second region depicting gingiva in the pre-treatment image 135. Once the blurring functions are generated, these blurring functions may be applied to image data such as sketches depicting contours of the teeth and gingiva post-treatment. For example, the blurring functions for the teeth may be applied to a third region depicting the teeth in a post-treatment sketch and the blurring functions for the gingiva may be applied to a fourth region depicting the gingiva in the post-treatment sketch.

In embodiments, the blurring functions for the teeth and/or gingiva are global blurring functions that are parametric functions. Examples of parametric functions that may be used include polynomial functions (e.g., such as biquadratic functions), trigonometric functions, exponential functions, fractional powers, and so on. In one embodiment, a set of parametric functions are generated that will function as a global blurring mechanism for a patient. The parametric functions may be unique functions generated for a specific patient based on an image of that patient's smile. With parametric blurring, a set of functions (one per color channel of interest) may be generated, where each function provides the intensity, I, for a given color channel, c, at a given pixel location, x,y according to the following equation:

$$I_c(x,y)=f(x,y) \quad (1)$$

A variety of parametric functions can be used for f. In one embodiment, a parametric function is used, where the parametric function can be expressed as:

$$I_c(x,y)=\Sigma_{i=0}^{N}\Sigma_{j=0}^{i}w(i,j)x^{i-j}y^j \quad (2)$$

In one embodiment, a biquadratic function is used. The biquadratic can be expressed as:

$$I_c(x,y)=w_0+w_1 x+w_2 y+w_3 xy+w_4 x^2+w_5 y^2 \quad (3)$$

Where $w_0, w_1, \ldots, w_5$ are weights (parameters) for each term of the biquadratic function, x is a variable representing a location on the x axis and y is a variable representing a location on the y axis (e.g., x and y coordinates for pixel locations, respectively).

The parametric function (e.g., the biquadratic function) may be solved using linear regression (e.g., multiple linear regression). Some example techniques that may be used to perform the linear regression include the ordinary least squares method, the generalized least squares method, the iteratively reweighted least squares method, instrumental variables regression, optimal instruments regression, total least squares regression, maximum likelihood estimation, rigid regression, least absolute deviation regression, adaptive estimation, Bayesian linear regression, and so on.

To solve the parametric function, a mask M of points may be used to indicate those pixel locations in the initial image that should be used for solving the parametric function. For example, the mask M may specify some or all of the pixel locations that represent teeth in the image if the parametric function is for blurring of teeth or the mask M may specify some or all of the pixel locations that represent gingiva if the parametric function is for the blurring of gingiva.

In an example, for any initial image and mask, M, of points, the biquadratic weights, $w_0, w_1, \ldots, w_5$, can be found by solving the least squares problem:

$$Aw^T = b \quad (4)$$

where:

$$w = [w_0, w_1, w_2, w_3, w_4, w_5] \quad (5)$$

$$A = \begin{bmatrix} 1 & x_0 & y_0 & x_0 y_0 & x_0^2 & y_0^2 \\ 1 & x_1 & y_1 & x_1 y_1 & x_1^2 & y_1^2 \\ \vdots & \vdots & \vdots & \vdots & \vdots & \vdots \\ 1 & x_n & y_n & x_n y_n & x_n^2 & y_n^2 \end{bmatrix} ; \forall x_i, y_i \in M \quad (6)$$

$$b = \begin{bmatrix} I_c(x_0, y_0) \\ I_c(x_1, y_1) \\ \vdots \\ I_c(x_n, y_n) \end{bmatrix} ; \forall x_i, y_i \in M \quad (7)$$

By constructing blurring functions (e.g., parametric blurring functions) separately for the teeth and the gum regions, a set of color channels can be constructed that avoid any pattern of dark and light spots that may have been present in the initial image as a result of shading (e.g., because one or more teeth were recessed).

In embodiments, the blurring functions for the gingiva are local blurring functions such as Gaussian blurring functions. A Gaussian blurring function in embodiments has a high radius (e.g., a radius of at least 5, 10, 20, 40, or 50 pixels). The Gaussian blur may be applied across the mouth region of the initial image in order to produce color information. A Gaussian blurring of the image involves convolving a two-dimensional convolution kernel over the image and producing a set of results. Gaussian kernels are parameterized by σ, the kernel width, which is specified in pixels. If the kernel width is the same in the x and y dimensions, then the Gaussian kernel is typically a matrix of size 6σ+1 where the center pixel is the focus of the convolution and all pixels can be indexed by their distance from the center in the x and y dimensions. The value for each point in the kernel is given as:

$$G(x, y) = \frac{1}{2\pi\sigma^2} e^{-\frac{x^2+y^2}{2\sigma^2}} \quad (8)$$

In the case where the kernel width is different in the x and y dimensions, the kernel values are specified as:

$$G(x, y) = G(x)G(y) = \frac{1}{2\pi\sigma_x\sigma_y} e^{-\left(\frac{x^2}{2\sigma_x^2} + \frac{y^2}{2\sigma_y^2}\right)} \quad (9)$$

One problem with using color channels produced via a Gaussian blurring function is that they maintain some structure in the very color they represent. In particular, one can see brighter and darker regions in the blurred image. When a trained neural network (e.g., a GAN model) attempts to color a sketch of the correctly positioned post-treatment teeth, the regions of light and dark from the original image may remain, causing the teeth to look discolored or possibly out of alignment. Accordingly, in embodiments the Gaussian blurring function is used to generate a blurred color representation of gingiva but not of teeth. In other embodiments, the Gaussian blurring function is used to generate a blurred color representation of the teeth.

In some embodiments, the blur produced by the blurring functions is sufficiently great that the tooth structure is not readily apparent to a human observer. The post treatment sketch and a blurred color image comprising a blurred color representation of the gingiva and a blurred color representation of the teeth may then be used together to generate a photo-realistic simulated post-treatment image of the patient's smile. Color data for the simulated image of the post-treatment smile may be based on the blurred color image and the shape of the teeth and gingiva in the simulated image may be based on the post-treatment image data (e.g., a sketch of the teeth and gingiva as they will appear after treatment).

In some embodiments, neural networks, such as generative adversarial networks (GANs), conditional GANs or picture to picture GANs may be used to generate a post-treatment image of a smile having teeth in a final treatment position. The neural network may integrate data from a 3D model of an upper and/or lower dental arch with teeth in a final position with blurred color image of the patient's smile. The blurred color image of the patient's smile may be generated by applying one or more generated blurring functions to the data from the 3D model as described above. The data may be received as 3D data or as 2D data (e.g., as a 2D view of a 3D virtual model of the patient's dental arch). The neural network may use the input data to generate a simulated post-treatment image that matches the colors, tones, shading, etc. from the blurred color image with the shape and contours of the teeth and gingiva from the post treatment image data (e.g., data from the 3D model).

The neural network may have been trained using a training dataset comprising facial images (e.g., images of smiles showing teeth and gingiva), sketches associated with the facial images (e.g., showing contours of the facial images but possibly lacking color data) and blurred color images comprising color data associated with the facial images. In some embodiments, the facial images are the target and the sketches and blurred color inputs are the inputs used for training the neural network. The neural network may be trained to generate a photo-realistic image of a smile based on a combined input that includes a blurred color image that lacks structural data and a sketch that has structural data but may lack color data. The neural network may also be trained to identify teeth and their contours. For example, each tooth may be identified by type (e.g., upper left central incosor, lower right canine). The neural network may also be trained to identify other aspects and features during training, such as the location and color of the gingiva, the color of the teeth, the relative brightness of the surfaces within the mouth, and others.

After training, the neural network receives inputs for use in generating a realistic rendering of the patient's teeth in a clinical final position. In order to provide color information to the GAN model, a blurred color image that represents a set of color channels is provided along with a post-treatment sketch of teeth and/or gingiva for a patient. The color channels are based on the initial photo and contain information about the color and lighting of the teeth and gums in that initial image. In order to avoid sub-optimal results from the GAN model, no structural information (e.g., tooth location, shape, etc.) remains in the blurred color image in embodiments.

As discussed above, the inputs may include a blurred color image of the patient's teeth and gingiva as well as an image (e.g., a sketch) of teeth and/or gingiva in a clinical final position (e.g., a 2D rendering of a 3D model of the patient's teeth in the clinical final position) a 3D rendered model of the patients teeth in the clinical final position, and so on. The clinical final position may have been determined, for example, according to an orthodontic treatment plan.

The neural network uses the inputs and a set of trained model parameters to render a realistic image of the patient's teeth in a final position. This photo realistic image is then integrated into the mouth opening of the facial image and an alpha channel blurring may be applied. In embodiments, the smile processing module 108 provides a significantly more realistic integration of the post treatment tooth and gingiva positions and shapes taken from the treatment plan with actual colors of the patient's teeth and gingiva.

In embodiments, pre-treatment images 135, simulated images 145, image data 138, blurred color representations 140 and blurring functions 142 may be stored in a data store 110 (or in separate data stores). For example, pre-treatment images 135, simulated images 145, image data 138 and blurred color representations 140 may be stored as entries in the same database or in separate databases. In an example, a database may contain separate entries for each x,y pixel location of a pre-treatment image 135. An entry may include a value for an x coordinate, a value for a y coordinate, values for each of the color channels of a color space at the x,y location, a value indicating whether the x,y pixel location is associated with a tooth region or a gingiva region, and so on. Operations performed by the smile processing module 108 to generate blurring functions 142, to generate blurred color representations 140 and/or to generate simulated images 145 may be performed as mathematical operations between different database entries in the data store 110 (or multiple data stores). For example, in equation (4) above A, b and w may each be separate entries in the same or separate databases. Matrix multiplication may be performed between the values of the separate database entries to solve for the blurring functions. Once simulated images 145 are generated, they may be stored in new database entries.

Figure 2:
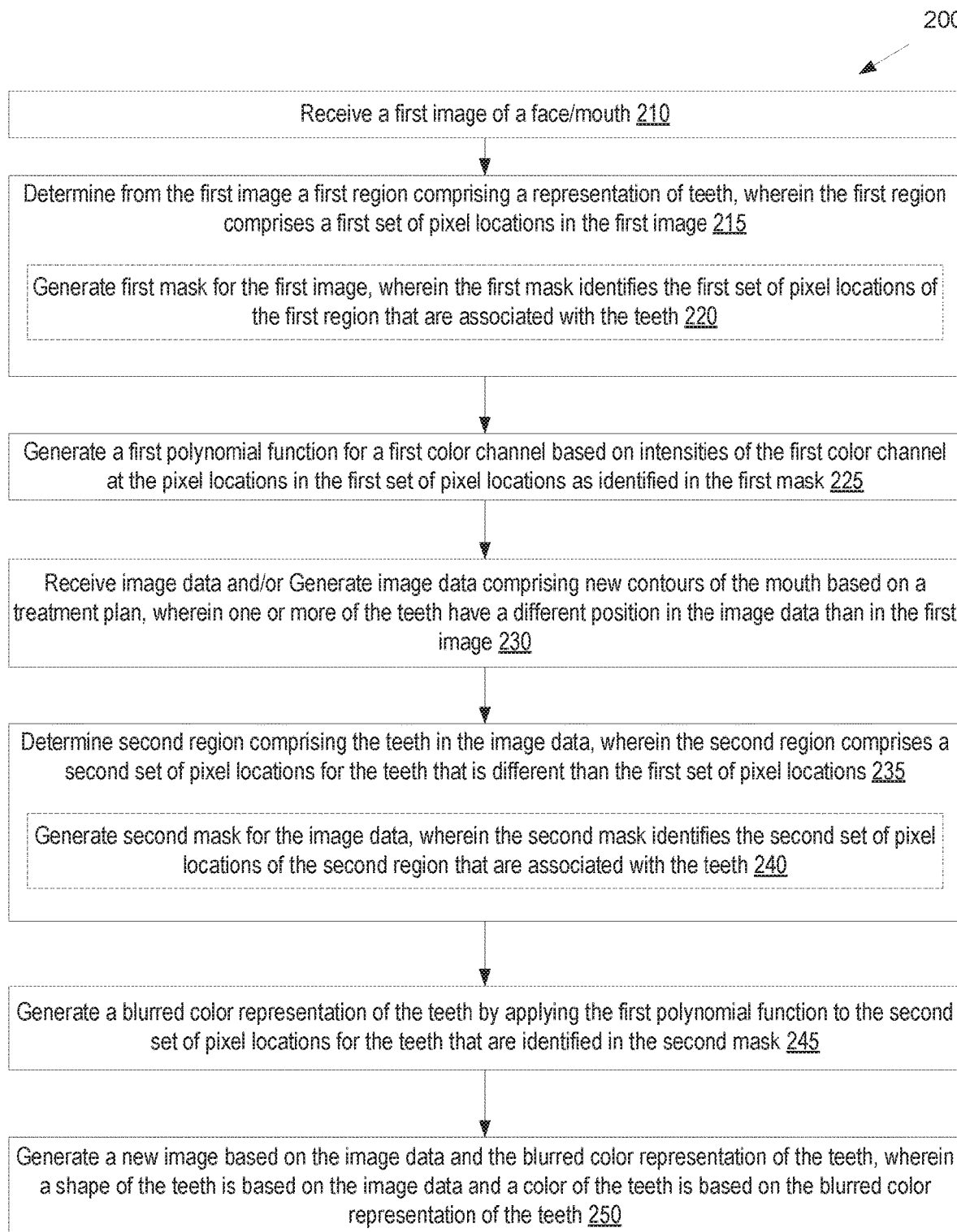
FIG. 2 illustrates a flow diagram for a method of generating simulated images of dental treatment outcomes, in accordance with an embodiment.
Figure 3:
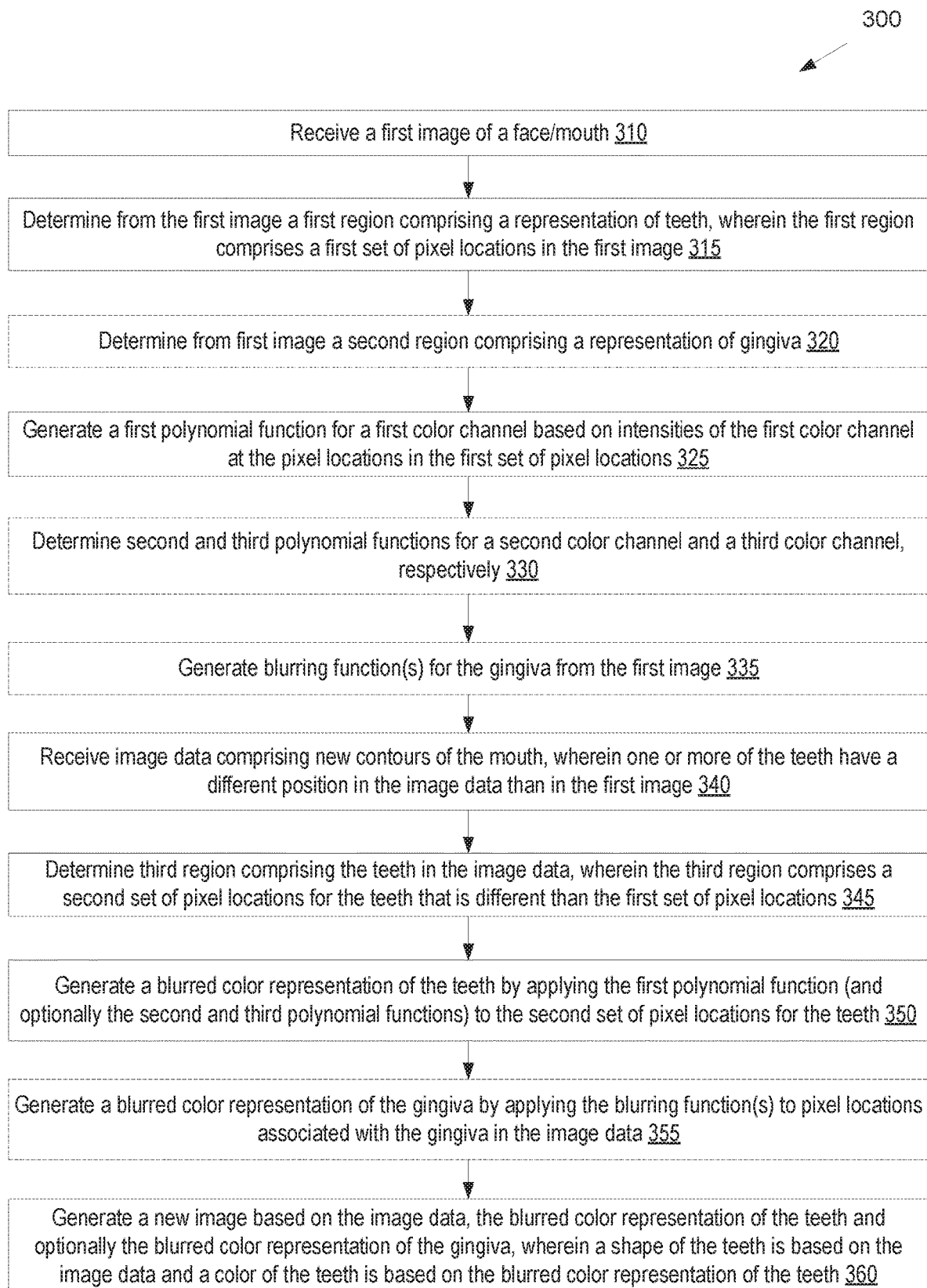
FIG. 3 also illustrates a flow diagram for a method of generating simulated images of dental treatment outcomes, in accordance with an embodiment.
Figure 4:
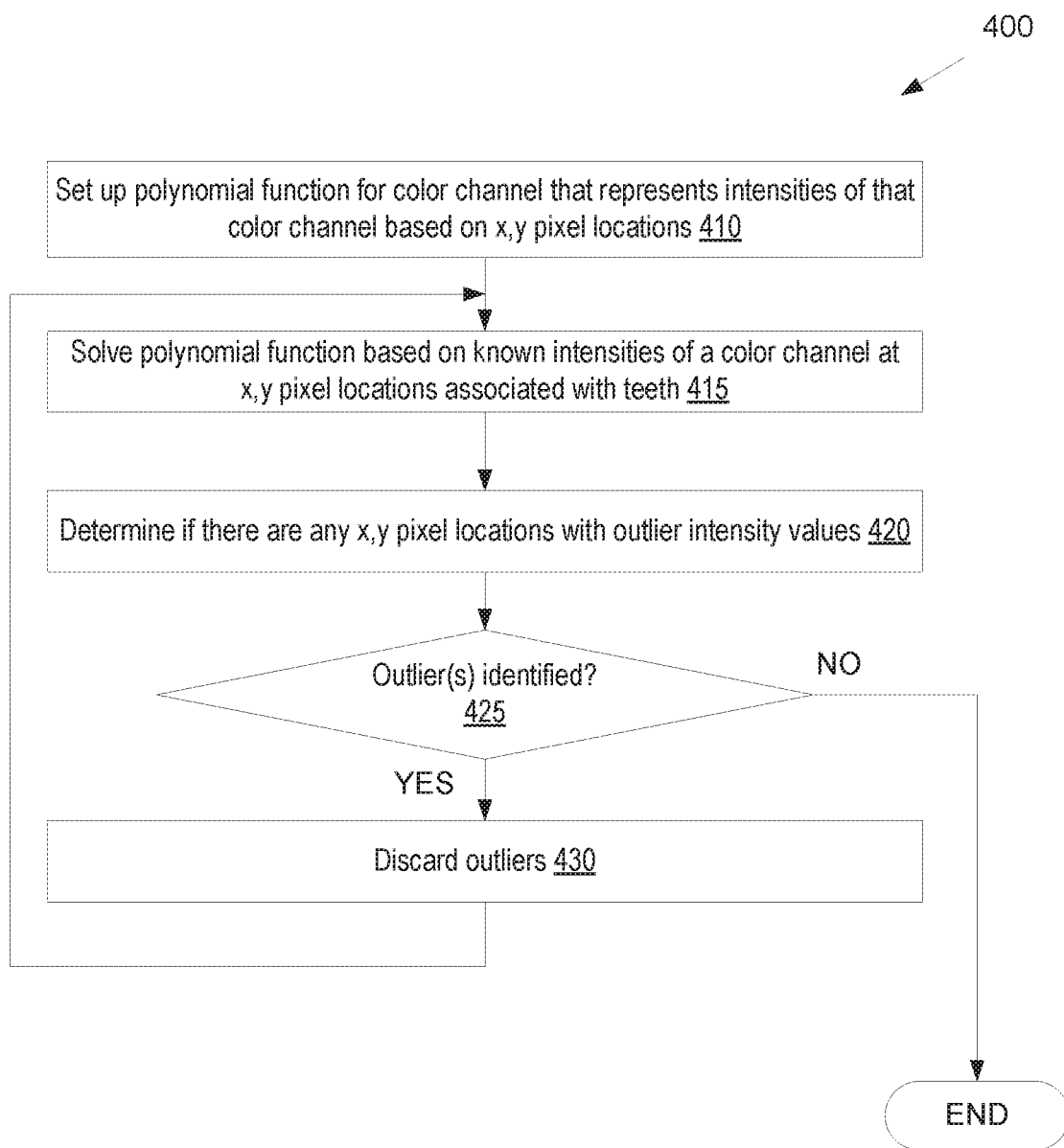
FIG. 4 illustrates a flow diagram for a method of generating a parametric color blurring function, in accordance with an embodiment.

FIGS. 2-4 below describe methods of generating parametric blurring functions and using the parametric blurring functions to generate simulated images of a patient's smile with accurate color data. The methods depicted in FIGS. 2-4 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 105 as described with reference to FIG. 1.

FIG. 2 illustrates a flow diagram for a method 200 of generating simulated images of dental treatment outcomes, in accordance with an embodiment. At block 210 of method 200, processing logic receives a first image of a patient's face and/or mouth. The image may be an image of the patient smiling with their mouth open such that the patient's teeth and gingiva are showing. The first image may be a two-dimensional (2D) color image in embodiments.

At block 215, processing logic determines from the first image a first region comprising a representation of teeth. The first region may include a first set of pixel locations (e.g., x and y coordinates for pixel locations) in the first image. The first region may be determined using a first mask of the first image in some embodiments, where the first mask identifies the first set of pixel locations of the first region that are associated with the teeth. The first mask may additionally identify pixel locations of a second region of the first image that is associated with gingiva.

In one embodiment, processing logic generates the first mask for the first image at block 220. The first mask may be generated based on user input identifying the first region and/or the second region. For example, a user may trace an outline of the teeth and an outline of the gingiva in the first image, and the first mask may be generated based on the traced outlines. In one embodiment, the first mask is generated automatically using one or more trained neural network (e.g., such as a deep neural network). For example, a first neural network may process the first image to determine a bounding box around the teeth and gingiva. The image data within the bounding box may then be processed using a second trained neural network and/or one or more image processing algorithms to identify the gingiva and/or teeth within the bounding box. This data may then be used to automatically generate the first mask without user input.

At block 225, processing logic generates a first parametric function for a first color channel based on intensities of the color channel at the pixel locations in the first set of pixel locations as identified in the first mask. Processing logic may also generate a second parametric function for a second color channel, a third parametric function for a third color channel, and/or one or more additional parametric functions for additional color channels (for color spaces that have more than three channels). Any color space may be used for the color channels associated with the parametric functions. For example, a red-blue-green color space may be used, in which a first parametric function may be generated for the red color channel, a second parametric function may be generated for the blue color channel and a third parametric function may be generated for the green color channel. A non-exhaustive list of other example color spaces that may be used include the hue, saturation, value (HSV) color space, the hue, saturation, luminance (HSL) color space, the YUV color space, the LAB color space, and the cyan, magenta, yellow black (CMYK) color space.

The parametric functions generated at block 225 are global blurring functions that may be used to generate blurred representations of teeth. Any type of polynomial function may be used for the global blurring functions. Some examples of polynomial functions that may be used include first order polynomial functions, second order polynomial functions, third order polynomial functions, fourth order polynomial functions, and so on. Other types of parametric functions that may be used include trigonometric functions, exponential functions, fractional powers, and so on. The parametric functions may be smooth functions that vary in the x direction and/or in the y direction. For example, the parametric functions may vary in only the x direction, in only the y direction, or in both the x direction and the y direction. The parametric functions are global functions that incorporate some local information. In one embodiment, the parametric functions are biquadratic functions (e.g., such as set forth in equation 3 above). In one embodiment, one or more of the parametric functions are biquadratic functions that lack cross terms (e.g., equation 3 above without the $w_3xy$ term). In other embodiments, the parametric functions may be, for example, linear polynomial functions, bilinear polynomial functions, and so on.

Each parametric function may be initially set up with unsolved weights (e.g., unsolved values for $w_0$, $w_1$, $w_2$, $w_3$, $w_4$ and $w_5$ for equation 3 above). Processing logic may then perform linear regression to solve for the values of the weights (also referred to as parameters) using the intensity values of the pixel locations indicated by the mask. In one embodiment, the least squares technique is applied to solve for the weights (e.g., as set forth in equations 4-7 above).

A similar process as set forth above may also be used to generate a set of blurring functions for gingiva. Alternatively, a Gaussian blurring function may be used for gingiva (e.g., as set forth in equations 8-9 above).

At block 230, processing logic receives image data and/or generates image data comprising new contours of the mouth based on a treatment plan. The image data may be a 2D sketch of post-treatment dentition, a projection of a 3D virtual model of a dental arch into a 2D plane, or other image data. A 3D virtual model may be oriented such that the mapping of the 3D virtual model into the 2D plane results in a simulated 2D sketch of the teeth and gingiva from a same perspective from which the first image was taken in some embodiments. The 3D virtual model may be included in a treatment plan, and may represent a final shape of the upper and/or lower dental arches of a patient after treatment is complete. Alternatively, or additionally, one or more 2D sketches of post-treatment dentition may be included in the treatment plan, with or without a 3D virtual model of the dental arch. Alternatively, or additionally, one or more 2D sketches may be generated from a 3D template. The image data may be a line drawing that includes contours of the teeth and gingiva, but that lacks color data for one or more regions (e.g., a region associated with the teeth). In one embodiment, generating the image data comprises projecting the 3D virtual model of an upper and/or lower dental arch into a 2D plane.

In one embodiment, generating the image data comprises inferring a likely 3D structure from the first image, matching the 3D structure to a template for a dental arch (e.g., a template with an ideal tooth arrangement), and then projecting the template into 2D. The 3D template may be selected from a set of available 3D templates, and the 3D template may be a template having a dental arch that most closely matches a dental arch in the first image. The 3D template may be oriented such that the mapping of the 3D template into the 2D plane results in a 2D sketch of teeth and gingiva from a same perspective from which the first image was taken in some embodiments.

At block 235, processing logic determines a second region comprising the teeth in the image data. The second region comprising the teeth may comprise a second set of pixel locations for the teeth that is different than the first set of pixel locations. For example, a treatment plan may call for the repositioning of one or more teeth of the patient. The first image may show those teeth in their initial positions and/or orientations (e.g., which may include a malocclusion), and the image data may show those teeth in their final positions and/or orientations (e.g., in which a previous malocclusion may have been treated).

In one embodiment, processing logic generates a second mask for the image data at block 240. Processing logic may also generate another mask for the gingiva for the image data. The second mask may identify the second set of pixel locations associated with the new positions and/or orientations of the teeth. The other mask for the gingiva may indicate pixel locations for the upper and/or lower gingiva post treatment. The second mask (and optionally other mask) may be generated in the same manner as discussed above with regards to the first mask. In some embodiments, a 3D virtual model or 3D template includes information identifying teeth and gingiva. In such an embodiment, the second mask and/or other mask may be generated based on the information in the virtual 3D model or 3D template identifying the teeth and/or the gingiva.

At block 245, processing logic generates a blurred color representation of the teeth by applying the first parametric function to the second set of pixel locations for the teeth that are identified in the second mask. This may include applying multiple different parametric functions to pixel locations in the image data as specified in the second mask. For example, a first parametric function for a first color channel may be applied to determine intensities or values of that first color channel for each pixel location associated with teeth, a second parametric function for a second color channel may be applied to determine intensities or values of that second color channel for each pixel location associated with the teeth, and a third parametric function for a third color channel may be applied to determine intensities or values of that third color channel for each pixel location associated with the teeth. The blurred color representation of the teeth may then include, for each pixel location associated with teeth in the image data, three different color values, one for each color channel. A similar process may also be performed for the gingiva by applying one or more blurring functions to the pixel locations associated with the gingiva. Accordingly a single blurred color image may be generated that includes a blurred color representation of the teeth and a blurred color representation of the gingiva, where different blurring functions were used to generate the blurred color data for the teeth and gingiva.

At block 250, a new image is generated based on the image data (e.g., the sketch containing contours of the teeth and gingiva) and the blurred color image (e.g., which may contain a blurred color representation of the teeth and optionally a blurred color representation of the gingiva). A shape of the teeth in the new simulated image may be based on the image data and a color of the teeth (and optionally gingiva) may be based on the blurred color image containing the blurred color representation of the teeth and/or gingiva. In one embodiment, the new image is generated by inputting the image data and the blurred color image into an artificial neural network that has been trained to generate images from an input line drawing (sketch) and an input blurred color image. In one embodiment, the artificial neural network is a GAN. In one embodiment, the GAN is a picture to picture GAN.

FIG. 3 also illustrates a flow diagram for a method 300 of generating simulated images of dental treatment outcomes, in accordance with an embodiment. At block 310 of method 300, processing logic receives a first image of a patient's face and/or mouth. The image may be an image of the patient smiling with their mouth open such that the patient's teeth and gingiva are showing. The first image may be a two-dimensional (2D) color image in embodiments.

At block 315, processing logic determines from the first image a first region comprising a representation of teeth. The first region may include a first set of pixel locations (e.g., x and y coordinates for pixel locations) in the first image. At block 320, processing logic may determine from the first image a second region comprising a representation of gingiva. The second region may include a second set of pixel locations in the first image.

The first region may be determined using a first mask of the first image in some embodiments, where the first mask identifies the first set of pixel locations of the first region that are associated with the teeth. The second region may be determined using a second mask of the first image, where the second mask identifies the second set of pixel locations of the second region that are associated with the gingiva. In one embodiment, a single mask identifies the first region associated with the teeth and the second region associated with the gingiva. In one embodiment, processing logic generates the first mask and/or the second mask as described with reference to block 220 of method 200.

At block 325, processing logic generates a first parametric function for a first color channel based on intensities (or other values) of the color channel at the pixel locations in the first set of pixel locations as identified in the first mask. At block 330, processing logic may also generate a second parametric function for a second color channel, a third parametric function for a third color channel, and/or one or more additional parametric functions for additional color channels (for color spaces that have more than three channels). Any color space may be used for the color channels associated with the parametric functions. For example, a red-blue-green color space may be used, in which a first parametric function may be generated for the red color channel, a second parametric function may be generated for the blue color channel and a third parametric function may be generated for the green color channel. A non-exhaustive list of other example color spaces that may be used include the hue, saturation, value (HSV) color space, the hue, saturation, luminance (HSL) color space, the YUV color space, the LAB color space, and the cyan, magenta, yellow black (CMYK) color space.

The parametric functions generated at blocks 325 and 330 are global blurring functions that may be used to generate blurred representations of teeth. Any of the aforementioned types of parametric functions may be used for the global blurring functions.

At block 335, blurring functions may be generated for the gingiva from the first image. In one embodiment, a set of parametric functions is generated for the gingiva in the same manner as set forth above for the teeth. For example, a mask identifying pixel locations associated with gingiva may be used to identify the pixel locations to be used to solve for the weights of one or more parametric functions. Alternatively, a Gaussian blurring function may be used for the gingiva (e.g., as set forth in equations 8-9 above) using the pixel locations associated with the gingiva.

At block 340, processing logic receives image data and/or generates image data comprising new contours of the mouth based on a treatment plan. The image data may be a projection of a 3D virtual model of a dental arch into a 2D plane. The 3D virtual model may be oriented such that the mapping of the 3D virtual model into the 2D plane results in a simulated 2D sketch of the teeth and gingiva from a same perspective from which the first image was taken in some embodiments. The 3D virtual model may be included in a treatment plan, and may represent a final shape of the upper and/or lower dental arches of a patient after treatment is complete. The image data may be a line drawing that includes contours of the teeth and gingiva, but that lacks color data. In one embodiment, generating the image data comprises projecting the 3D virtual model of an upper and/or lower dental arch into a 2D plane.

At block 345, processing logic determines a third region comprising the teeth in the image data. The third region comprising the teeth may comprise a second set of pixel locations for the teeth that is different than the first set of pixel locations. In one embodiment, processing logic generates a second mask for the image data, and the second mask is used to determine the third region.

At block 350, processing logic generates a blurred color representation of the teeth by applying the first parametric function and optionally the second, third and/or fourth parametric functions to the second set of pixel locations for the teeth that are associated with the third region. The blurred color representation of the teeth may then include, for each pixel location associated with teeth in the image data, three (or four) different color values, one for each color channel. The third region of the image data may have more or fewer pixels than the first region of the first image. The parametric function works equally well whether the third region has fewer pixels, the same number of pixels, or a greater number of pixels.

At block 355, processing logic may generate a blurred color representation of the gingiva by applying the one or more blurring functions for the gingiva to pixel locations associated with the gingiva in the image data. The blurred color representation of the teeth may be combined with the blurred color representation of the gingiva to generate a single blurred color image.

At block 360, a new image is generated based on the image data (e.g., the sketch containing contours of the teeth and gingiva) and the blurred color image (e.g., which may contain a blurred color representation of the teeth and optionally a blurred color representation of the gingiva). A shape of the teeth in the new simulated image may be based on the image data and a color of the teeth (and optionally gingiva) may be based on the blurred color image containing the blurred color representation of the teeth and/or gingiva. In one embodiment, the new image is generated by inputting the image data and the blurred color image into an artificial neural network that has been trained to generate images from an input line drawing (sketch) and an input blurred color image. In one embodiment, the artificial neural network is a GAN. In one embodiment, the GAN is a picture to picture GAN.

In some instances the lower gingiva may not be visible in the first image, but may be visible in the new simulated image that is generated at block 360. In such instances, parametric functions generated for the use of blurring the color data for the gingiva may cause the coloration of the lower gingiva to be inaccurate. In such instances, one or more Gaussian blurring functions may be generated for the gingiva at block 335.

FIG. 4 illustrates a flow diagram for a method 400 of generating a parametric color blurring function, in accordance with an embodiment. Method 400 may be performed for each parametric blurring function that will be generated for an image. For example, if parametric functions will be used to generate both blurred color representations of teeth and gingiva, then six or eight total parametric blurring functions may be set up, where 3-4 of the parametric functions are set up for the various color channels associated with teeth and 3-4 of the parametric functions are set up for the various color channels associated with the gingiva.

At block 410 of method 400, processing logic sets up a parametric function for a color channel that represents intensities (or other values) of that color channel based on x,y pixel location. Setting up the parametric function may include generating an unsolved parametric function for which the weights associated with the terms of the parametric function are unknown (e.g., as shown in equation 3 above).

At block 415, processing logic solves the parametric function based on known intensities (or other values) of the color channel at all or a subset of the x,y pixel locations associated with teeth (or the x,y pixel locations associated with gingiva if the parametric function will be used for gingiva). The parametric function may be solved by performing regression as discussed above (for example with reference to equations 4-7). An initial image (e.g., as generated by a camera or image sensor) may include representations of teeth, and a mask may identify those pixel locations that are associated with representations of teeth. Accordingly, the x,y pixel locations for teeth and the color values for a particular color channel at those x,y pixel locations are known. This information can be used to solve for the weights in the parametric function by performing multiple linear regression.

In some embodiments, one or more outlier rejection techniques are used to generate parametric functions that are a better fit to the color data of the teeth (or gingiva) in the first image. In one embodiment, at block 420 processing logic determines if there are any x,y pixel locations with outlier intensity values for the color channel. Examples of outlier detection techniques that may be used to detect (and optionally reject) outliers include z-score, standard deviation, density based spatial clustering of applications with noise (Dbscan) and isolation forests. For example, processing logic may determine for each x,y pixel location an intensity for the color channel specified by the parametric function and compare that intensity value to an actual measured intensity value at that x,y pixel location. Processing logic may determine whether a difference between the two intensity values exceeds a difference threshold. The difference threshold may be set, for example, based on a standard deviation of the differences between measured and predicted intensity values. If the difference exceeds a difference threshold, then at block 420 processing logic may identify an outlier. If an outlier is identified, then processing logic discards the outlier (or multiple outliers) at block 430.

The method may then return to block 415 and the parametric function may be solved again using the remaining pixel locations. This process may be repeated until no new outliers are identified. If at block 425 no new outliers are identified, then the method ends.

In one embodiment, the random sample consensus (RANSAC) is used to determine an optimal parametric function that fits the data. Other related techniques that may be used include maximum likelihood estimate sample consensus (MLESAC) and maximum a posterior sample consensus (MAPSAC). The outlier rejection technique or techniques may be applied so as to discard color data for teeth that might be discolored (e.g., black or gray). Such color data for the discolored teeth could negatively impact the parametric functions and cause the coloration of other teeth to be inaccurate. Accordingly, the outlier rejection technique(s) such as RANSAC may be applied on the parametric fit to improve the ultimate blurred color representation of the teeth.

Figure 5:
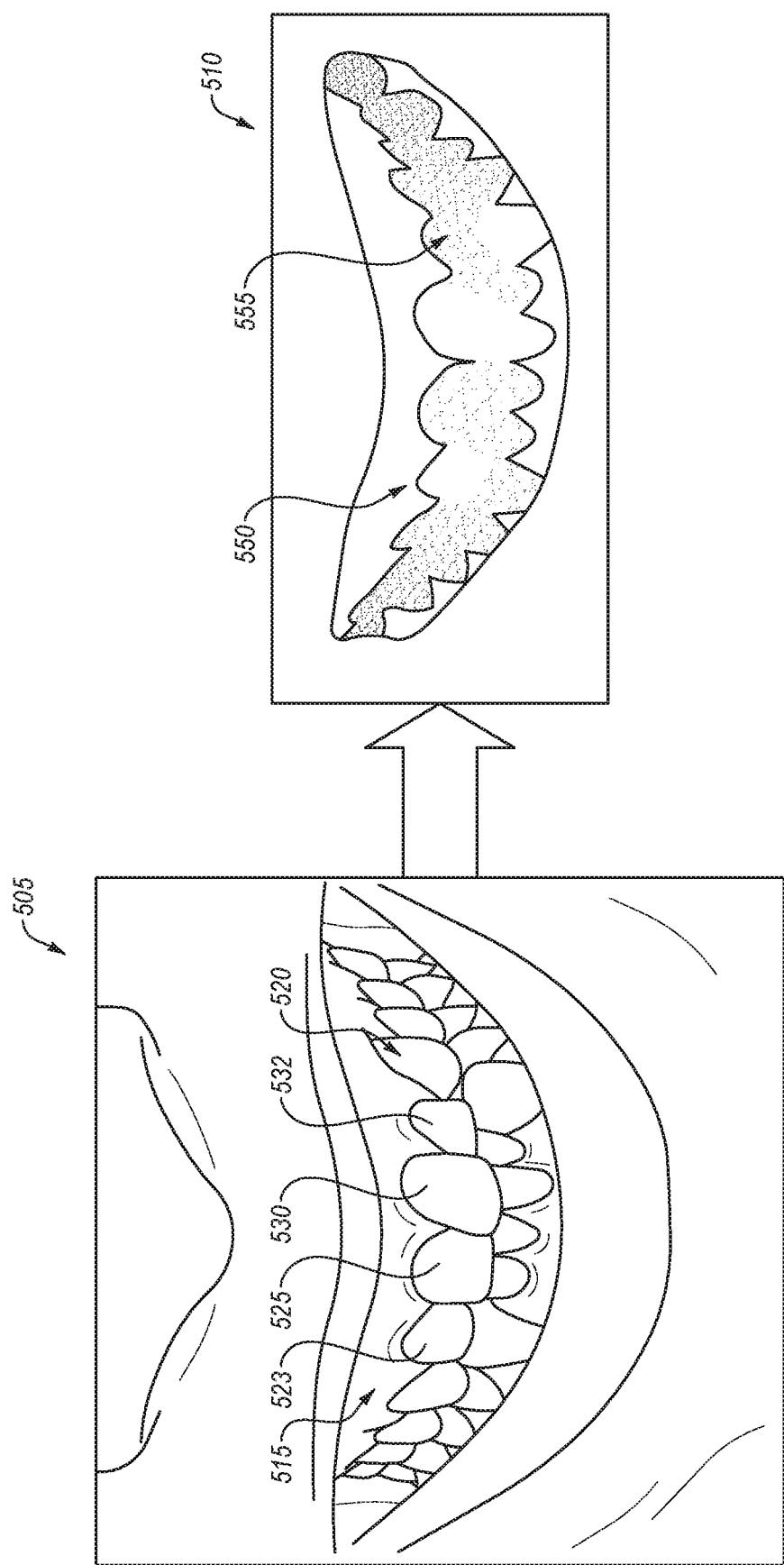
FIG. 5 illustrates an image of a patient smile and a blurred representation of the teeth and gingiva from the image, in accordance with an embodiment.
Figure 6:
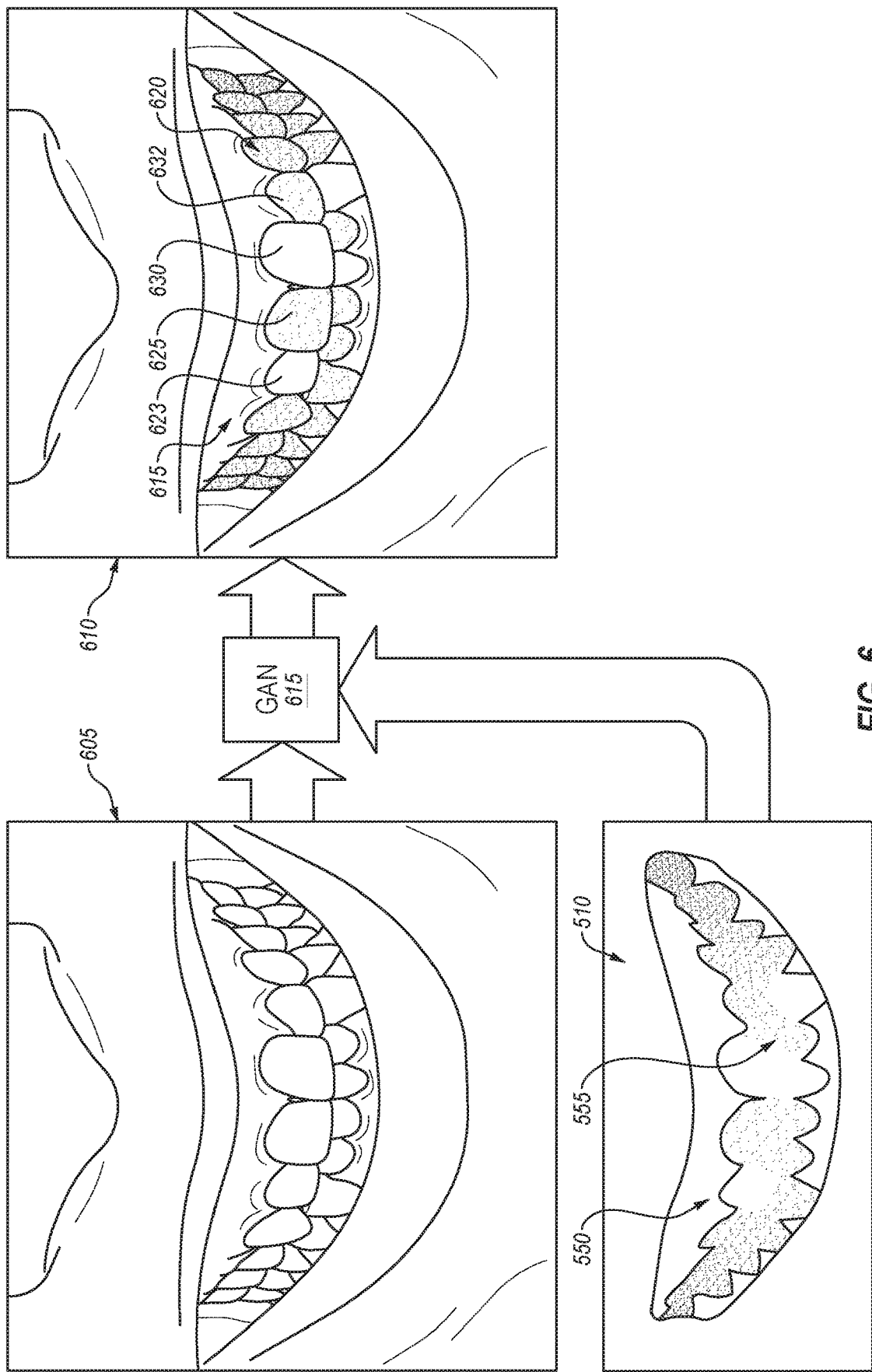
FIG. 6 illustrates a simulated image of a post-treatment patient smile as generated by a neural network based on a first input of image data representing post-treatment teeth and gingiva contours and a second input of a blurred representation of the teeth and gingiva, in accordance with one embodiment.

FIGS. 5-6 depict use of a local blurring function (e.g., a Gaussian blurring function) to generate a simulated image of a post-treatment smile based on an initial image of a pre-treatment smile. FIG. 5 illustrates an image 505 of a patient smile and a blurred color image 510 including a blurred color representation of the teeth 555 and a blurred color representation of the gingiva 550 from the image 505, in accordance with an embodiment. As shown, image 505 includes gingiva 515 and teeth 520. In the image 505, the maxillary lateral left incisor 523 is prominent and the maxillary lateral right incisor 532 is recessed and in shadow. Similarly, the maxillary central left incisor 525 is recessed and the maxillary central right incisor 530 is prominent. This arrangement of teeth causes the maxillary lateral left incisor 523 and the maxillary central right incisor 530 to be brighter than the maxillary lateral right incisor 532 and the maxillary central left incisor 525. The blurred color image 510 generated from the image 505 using Gaussian blurring does not have structural data, but does have bright spots associated with the locations of the maxillary lateral left incisor 523 and the maxillary central right incisor 530 and dark spots associated with the locations of the maxillary lateral right incisor 532 and the maxillary central left incisor 525.

FIG. 6 illustrates a simulated image 610 of a post-treatment patient smile as generated by a neural network 615 based on a first input of image data 605 representing post-treatment teeth and gingiva contours and a second input of a blurred color image 510 that includes a blurred color representation of the teeth 555 and a blurred color representation of the gingiva 550, in accordance with one embodiment. As shown, the blurred color image 510 includes the aforementioned dark spots and bright spots. This causes the neural network (e.g., a picture to picture GAN) 615 to generate a simulated image 610 of a post treatment smile including gingiva 615 and teeth 620 in which the maxillary lateral left incisor 623 is brighter than the maxillary lateral right incisor 632 and in which the maxillary central right incisor 630 is brighter than the maxillary central left incisor 625.

Figure 7:
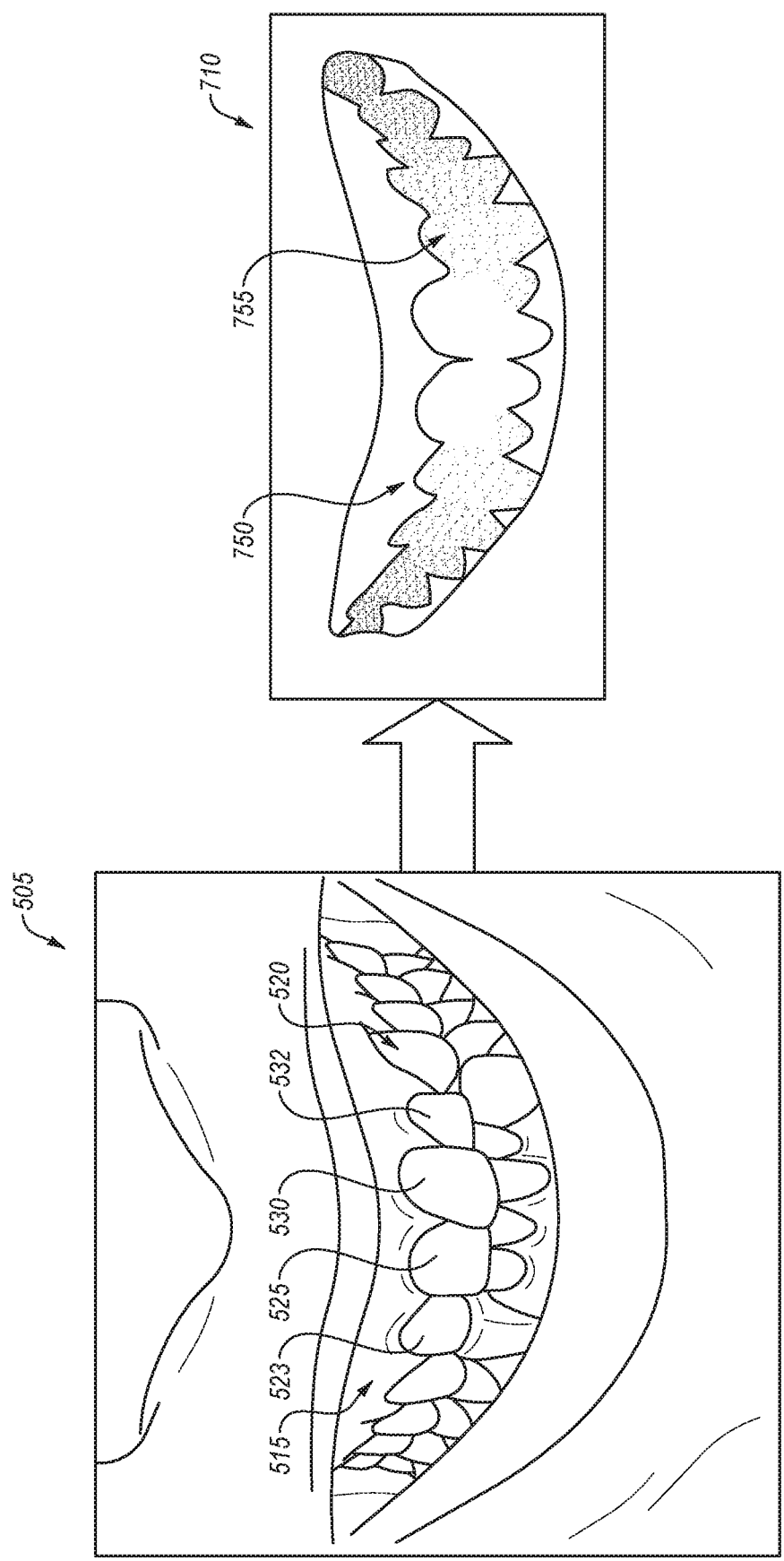
FIG. 7 illustrates an image of a patient smile and a blurred representation of the teeth and gingiva from the image, in accordance with an embodiment.
Figure 8:
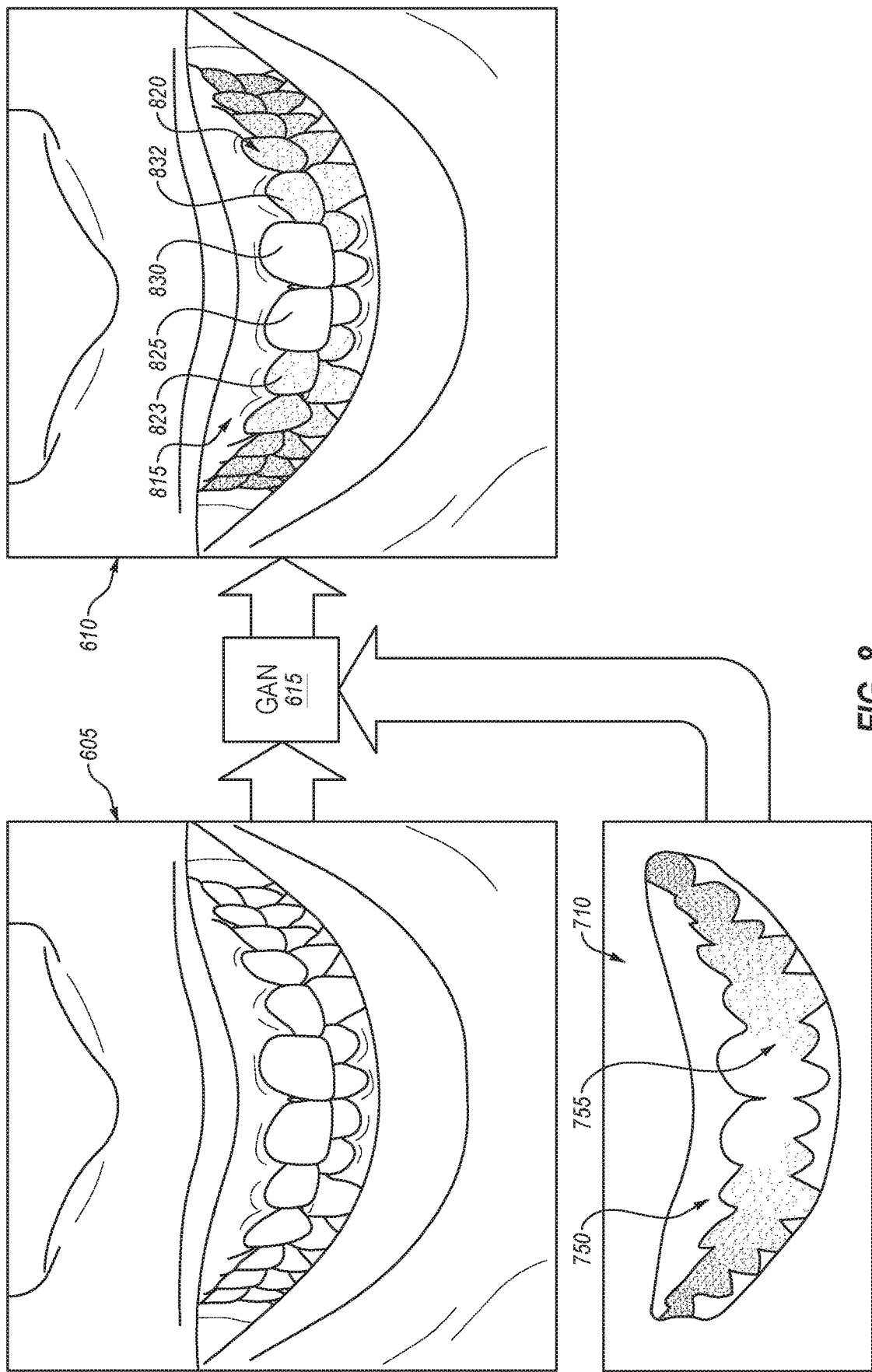
FIG. 8 illustrates a simulated image of a post-treatment patient smile as generated by a neural network based on a first input of image data representing post-treatment teeth and gingiva contours and a second input of a blurred representation of the teeth and gingiva, in accordance with one embodiment.

FIGS. 7-8 depict use of a global blurring function (e.g., a polynomial blurring function) to generate a simulated image of a post-treatment smile based on an initial image of a pre-treatment smile. FIG. 7 illustrates the image 505 of a patient smile shown in FIG. 5 and a blurred color image 710 including a blurred color representation of the teeth 755 and a blurred color representation of the gingiva 750 from the image 505, in accordance with an embodiment. However, in contrast to the blurred color image 510 of FIG. 5, the blurred color image 710 is generated using parametric blurring functions, where the parametric blurring functions were generated using pixel locations of teeth in the image 505. As shown, the blurred color representation of the teeth 755 has approximately the same intensity and color for the areas associated with the maxillary central left incisor 525 and the maxillary central right incisor 530. Similarly, the blurred color representation of the teeth 755 has approximately the same intensity and color for the areas associated with the maxillary lateral left incisor 523 and the maxillary lateral right incisor 532.

FIG. 8 illustrates a simulated image 810 of a post-treatment patient smile as generated by a neural network 615 based on a first input of image data 605 representing post-treatment teeth and gingiva contours and a second input of a blurred color image 710 comprising a blurred color representation of the teeth 755 and a blurred color representation of the gingiva 750, in accordance with one embodiment. As shown, the blurred color image 710 includes an approximately smooth transition from light colors/intensities at the central incisors to dark colors/intensities at the molars. This causes the neural network (e.g., a picture to picture GAN) 615 to generate a simulated image 810 of a post treatment smile including gingiva 815 and teeth 820 in which the maxillary lateral left incisor 823 has approximately a same intensity as the maxillary lateral right incisor 832 and in which the maxillary central right incisor 830 has approximately the same intensity as the maxillary central left incisor 825. Accordingly, the blurred color image that has been generated using parametric blurring functions can be used along with image data (e.g., a sketch or contours of a final position of teeth) as inputs into an artificial neural network 615 to enable the artificial neural network 615 to generate a simulated image 810 that has accurate texture data that more closely corresponds to the colors that the teeth would have after treatment.

Figure 9:
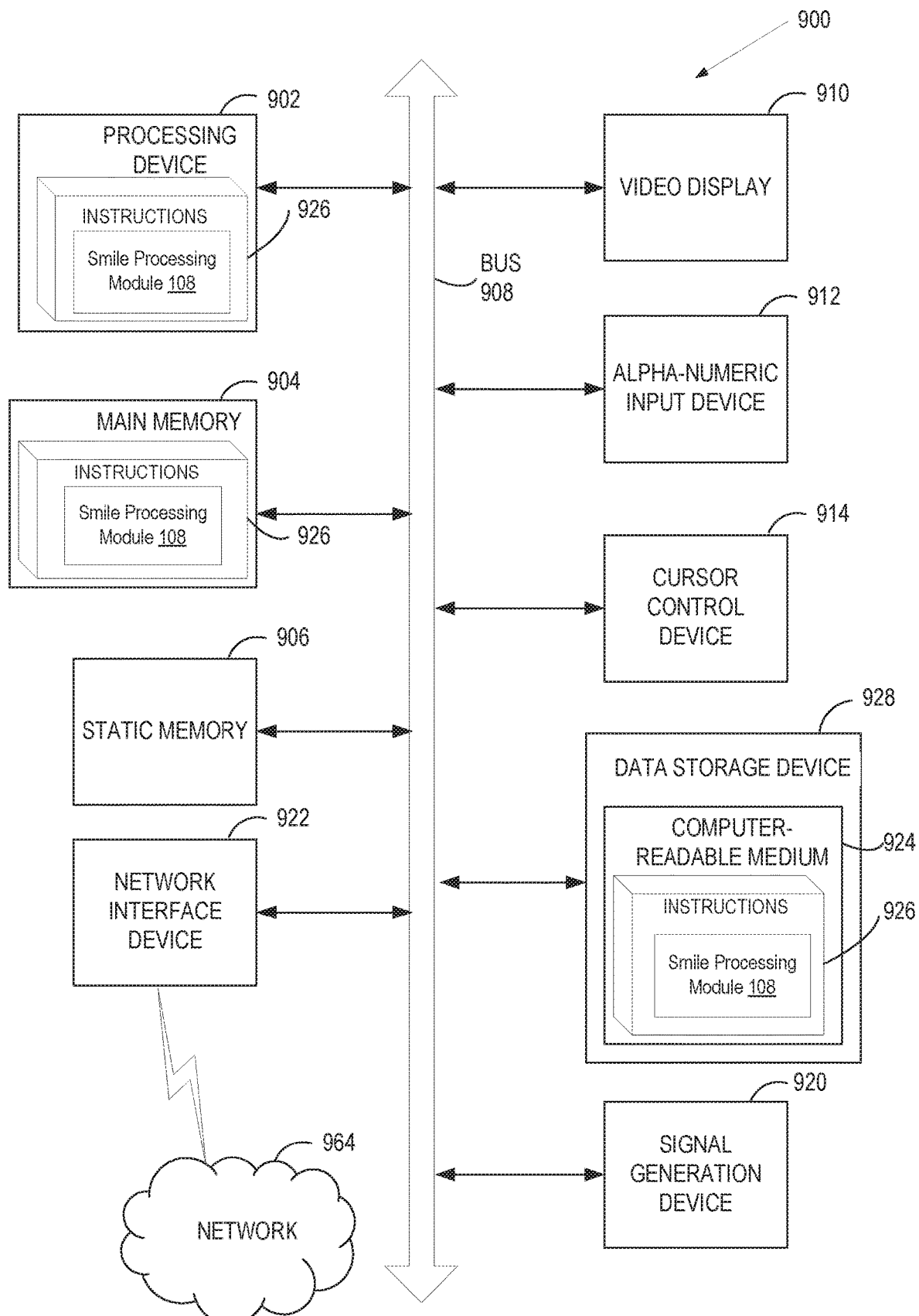
FIG. 9 illustrates a block diagram of an example computing device, in accordance with embodiments of the present disclosure.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computer device 900 corresponds to computing device 105 of FIG. 1.

The example computing device 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 928), which communicate with each other via a bus 908.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 926) for performing operations and steps discussed herein.

The computing device 900 may further include a network interface device 922 for communicating with a network 964. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 928 may include a machine-readable storage medium (or more specifically a non-transitory computer-readable storage medium) 924 on which is stored one or more sets of instructions 926 embodying any one or more of the methodologies or functions described herein, such as instructions for a smile processing module 108. A non-transitory storage medium refers to a storage medium other than a carrier wave. The instructions 926 may also reside, completely or at least partially, within the main memory 904 and/or within the processing device 902 during execution thereof by the computer device 900, the main memory 904 and the processing device 902 also constituting computer-readable storage media.

The computer-readable storage medium 924 may also be used to store a smile processing module 108. The computer readable storage medium 924 may also store a software library containing methods for a smile processing module 108. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   determining, from a first image of a mouth, a first region of the first image comprising a representation of teeth, wherein the first region comprises a first set of pixel locations in the first image;
   generating a first parametric function for a first color channel based on intensities of the first color channel at the pixel locations in the first set of pixel locations, wherein the first parametric function comprises a first variable for a first image axis and a second variable for a second image axis;
   receiving image data comprising new contours of the mouth, wherein one or more of the teeth have a different position in the image data than in the first image;
   determining a second region comprising the teeth in the image data, wherein the second region comprises a second set of pixel locations for the teeth that is different than the first set of pixel locations; and
   generating a new image based on the image data and the first parametric function, wherein a shape of the teeth is based on the image data and a color of the teeth is based on applying the first parametric function to the second set of pixel locations for the teeth.

2. The method of claim 1, further comprising:
   generating a first mask for the first image, wherein the first mask identifies the first set of pixel locations of the first region that are associated with the teeth; and
   generating a second mask for the image data, wherein the second mask identifies the second set of pixel locations of the second region that are associated with the teeth.

3. The method of claim 1, wherein regions of the image data lack color data for the teeth.

4. The method of claim 1, further comprising:
   receiving the first image, wherein the first image was generated by an image sensor, and
   generating the image data based on a treatment plan.

5. The method of claim 1, further comprising:
generating a second parametric function for a second color channel based on intensities of the second color channel at the pixel locations in the first set of pixel locations; and
generating a third parametric function for a third color channel based on intensities of the third color channel at the pixel locations in the first set of pixel locations;
wherein the color of the teeth is further based on a) applying the second parametric function to the second set of pixel locations for the teeth and b) applying the third parametric function to the second set of pixel locations for the teeth.

6. The method of claim 1, wherein the first parametric function is a bi-quadratic function having the form $I(x, y)=w_0+w_1x+w_2y+w_3xy+w_4x^2+w_5y^2$, where x is the first image axis, y is the second image axis, I is the intensity of a pixel at a pixel location, and $w_0, w_1, w_2, w_3, w_4$ and $w_5$ are constants.

7. The method of claim 1, wherein generating the first parametric function comprises:
performing linear regression to solve for parameters of the first parametric function.

8. The method of claim 1, further comprising:
determining a subset of the first set of pixel locations that are outliers; and
excluding the subset of the first set of pixel locations during the generation of the first parametric function such that the subset of the first set of pixel locations are not used to generate the first parametric function.

9. The method of claim 1, further comprising:
determining, from the first image of the mouth, a third region of the first image comprising a representation of gingiva, wherein the third region comprises a third set of pixel locations in the first image;
determining a blurred color representation for the third region; and
determining a fourth region comprising the gingiva in the image data, wherein the fourth region comprises a fourth set of pixel locations for the gingiva;
wherein a shape of the gingiva in the new image is based on the image data and a color of the gingiva in the new image is based on applying the blurred color representation to the fourth set of pixel locations for the gingiva.

10. The method of claim 9, wherein determining the blurred color representation comprises:
generating a second parametric function for the first color channel based on intensities of the first color channel at the pixel locations in the third set of pixel locations.

11. The method of claim 1, further comprising:
generating a blurred color representation of the teeth by applying the first parametric function to the second set of pixel locations for the teeth; and
processing the blurred color representation of the teeth and the received image data by a neural network to generate the new image.

12. The method of claim 11, wherein the first image is stored in a first database entry, the image data is stored in a second database entry, and the blurred color representation is stored in a third database entry, the method further comprising:
writing the new image to a fourth database entry.

13. The method of claim 11, wherein the neural network is a pixel to pixel generative adversarial network that was trained using a training dataset comprising a plurality of images of smiles.

14. A non-transitory computer readable storage medium comprising instructions that, when executed by a processing device, cause the processing device to perform operations comprising:
determining, from a first image of a mouth, a first region of the first image comprising a representation of teeth, wherein the first region comprises a first set of pixel locations in the first image;
generating, by the processing device, a first parametric function for a first color channel based on intensities of the first color channel at the pixel locations in the first set of pixel locations, wherein the first parametric function comprises a first variable for a first image axis and a second variable for a second image axis;
receiving image data comprising new contours of the mouth, wherein one or more of the teeth have a different position in the image data than in the first image;
determining a second region comprising the teeth in the image data, wherein the second region comprises a second set of pixel locations for the teeth that is different than the first set of pixel locations;
generating a blurred color representation of the teeth by applying the first parametric function to the second set of pixel locations for the teeth; and
generating a new image based on the image data and the blurred color representation of the teeth, wherein a shape of the teeth is based on the image data and a color of the teeth is based on the blurred color representation of the teeth.

15. The non-transitory computer readable storage medium of claim 14, wherein the instructions further cause the processing device to perform operations comprising:
generating a first mask for the first image, wherein the first mask identifies the first set of pixel locations of the first region that are associated with the teeth; and
generating a second mask for the image data, wherein the second mask identifies the second set of pixel locations of the second region that are associated with the teeth.

16. The non-transitory computer readable storage medium of claim 14, wherein the instructions further cause the processing device to perform operations comprising:
generating a second parametric function for a second color channel based on intensities of the second color channel at the pixel locations in the first set of pixel locations; and
generating a third parametric function for a third color channel based on intensities of the third color channel at the pixel locations in the first set of pixel locations;
wherein the color of the teeth is further based on a) applying the second parametric function to the second set of pixel locations for the teeth and b) applying the third parametric function to the second set of pixel locations for the teeth.

17. The non-transitory computer readable storage medium of claim 14, wherein the first parametric function is a bi-quadratic function having the form $I(x, y)=w_0+w_1x+w_2y+w_3xy+w_4x^2+w_5y^2$, where x is the first image axis, y is the second image axis, I is the intensity of a pixel at a pixel location, and $w_0, w_1, w_2, w_3, w_4$ and $w_5$ are constants.

18. The non-transitory computer readable storage medium of claim 14, wherein the instructions further cause the processing device to perform operations comprising:
determining, from the first image of the mouth, a third region of the first image comprising a representation of gingiva, wherein the third region comprises a third set of pixel locations in the first image;

determining a blurred color representation for the third region; and determining a fourth region comprising the gingiva in the image data, wherein the fourth region comprises a fourth set of pixel locations for the gingiva;

wherein a shape of the gingiva in the new image is based on the image data and a color of the gingiva in the new image is based on applying the blurred color representation to the fourth set of pixel locations for the gingiva.

19. The non-transitory computer readable storage medium of claim 14, wherein the instructions further cause the processing device to perform operations comprising:

processing the blurred color representation of the teeth and the received image data by a neural network to generate the new image, wherein the neural network is a pixel to pixel generative adversarial network that was trained using a training dataset comprising a plurality of images of smiles.

20. A system comprising:

a memory device; and a processing device operatively coupled to the memory device, the processing device to:

determine, from a first image of a mouth, a first region of the first image comprising a representation of teeth, wherein the first region comprises a first set of pixel locations in the first image;

generate a first parametric function for a first color channel based on intensities of the first color channel at the pixel locations in the first set of pixel locations, wherein the first parametric function comprises a first variable for a first image axis and a second variable for a second image axis;

receiving image data comprising new contours of the mouth, wherein one or more of the teeth have a different position in the image data than in the first image;

generating a blurred color representation of the teeth by applying the first parametric function to the image data; and generating a new image based on the image data and the blurred color representation of the teeth, wherein a shape of the teeth is based on the image data and a color of the teeth is based on the blurred color representation of the teeth.

* * * * *